United States Patent [19]

Monteith et al.

[11] Patent Number: 4,707,585

[45] Date of Patent: Nov. 17, 1987

[54] LASER WRIST WITH SEALED BEAM PATHWAY

[75] Inventors: Robert C. Monteith, Milford; Robert E. Borgmann, Cincinnati, both of Ohio

[73] Assignee: Cincinnati Milacron Inc., Cincinnati, Ohio

[21] Appl. No.: 840,167

[22] Filed: Mar. 17, 1986

[51] Int. Cl.[4] ............................................. B23K 26/02
[52] U.S. Cl. ........................ 219/121 LV; 219/121 LU
[58] Field of Search ................. 219/121 LC, 121 LD, 219/121 LG, 121 LN, 121 LU, 121 LV; 901/38, 42, 47, 29; 350/622, 623

[56] References Cited

U.S. PATENT DOCUMENTS 3,986,767  10/1976  Rexer et al. ................. 219/121 L X

FOREIGN PATENT DOCUMENTS 0160293  11/1985  European Pat. Off. ..... 219/121 LU
2153785   8/1985  United Kingdom ............ 219/121 L

*Primary Examiner*—C. L. Albritton
*Attorney, Agent, or Firm*—Thomas M. Farrell

[57] ABSTRACT

A laser beam pathway is established through hollow robotic wrist elements, including plural elements rotatable around first and second wrist axes transverse to one another and intersecting at a junction point. The junction point lies within a mirror chamber formed within a base housing of the robot elements, and a mirror is mounted within the mirror chamber to assist in directing the laser beam. The beam passes collinearly with the first and second wrist axes and first and second ducts are provided with a rotary joint included in the second duct, to isolate the beam pathway from internal wrist drive elements.

7 Claims, 34 Drawing Figures

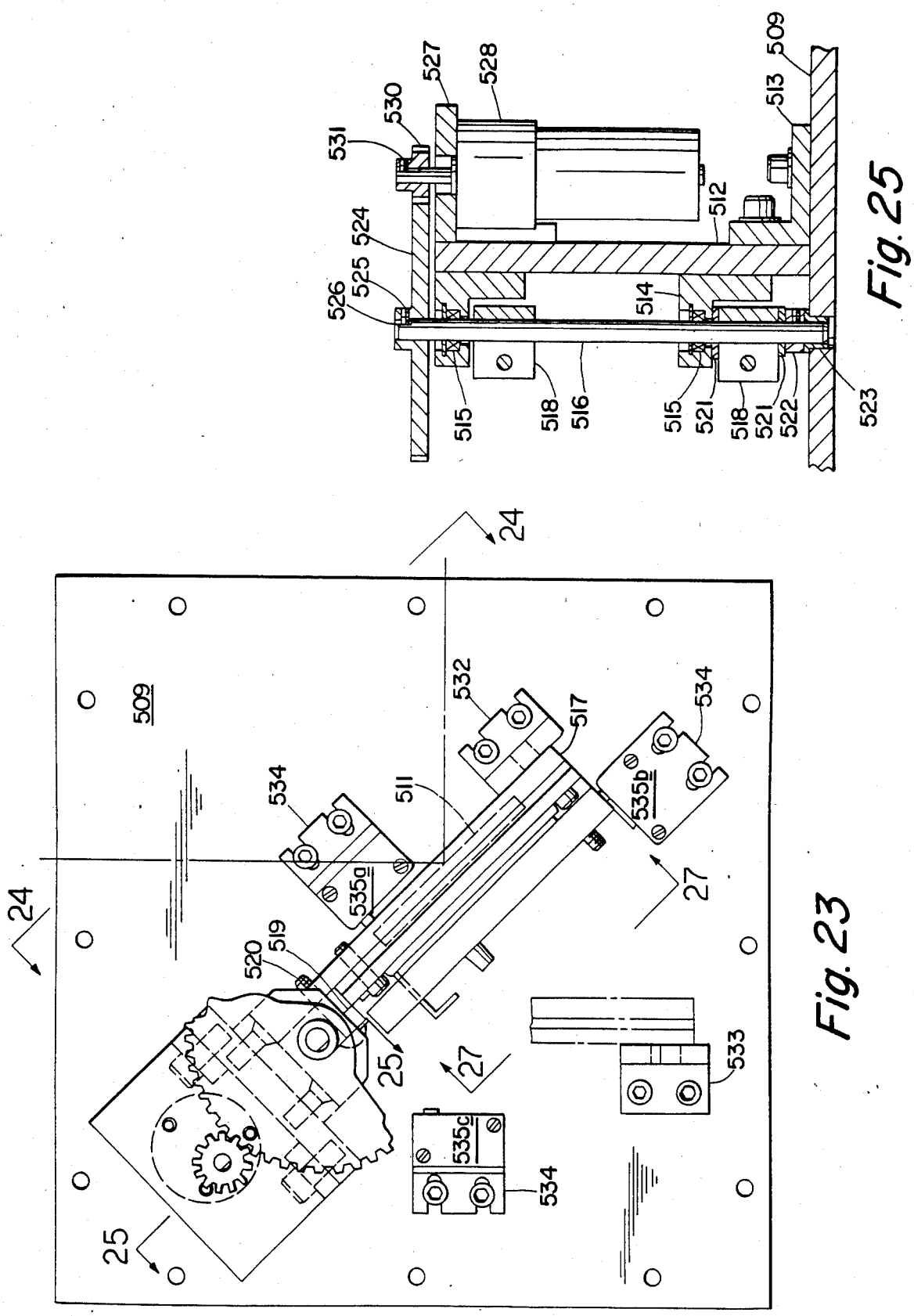

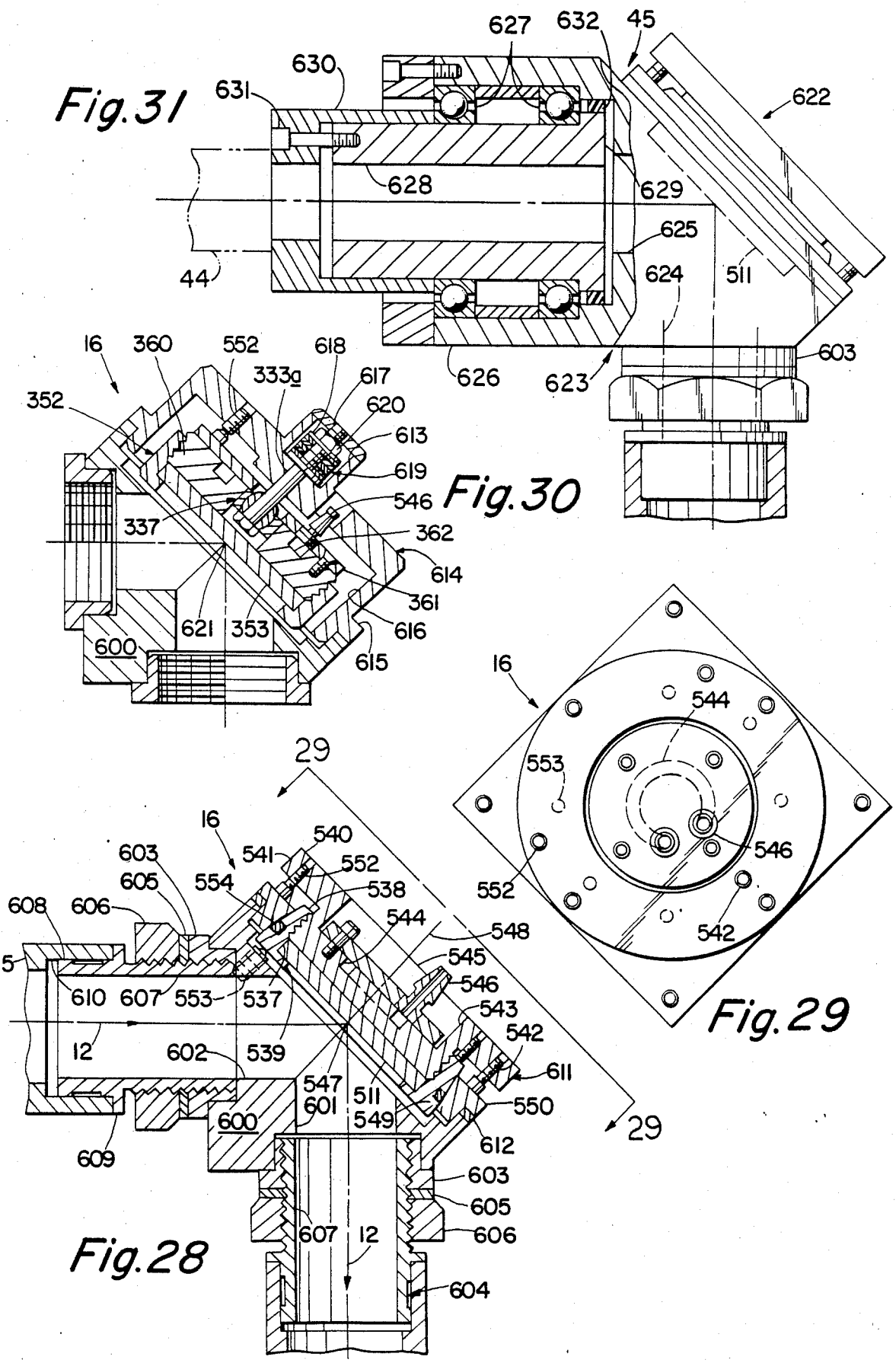

LASER WRIST WITH SEALED BEAM PATHWAY

BACKGROUND OF THE INVENTION

The invention relates to laser robotics, and in particular relates to a laser robotic system wherein a laser beam is ducted through a laser wrist, having motorized elements. The laser wrist is provided with a sealed beam pathway to isolate the beam pathway from the wrist mechanism.

Prior art "laser robotic" systems typically employ a passive light pipe system consisting of a series of light pipes linked at mirrored joints, wherein the initial light pipe is affixed to a laser generator, and the final light pipe is attached to the end effector tooling plate of a laser wrist.

Difficulties inherent in prior art assemblies include binding of the light pipe system and intrusion of the system with other elements at the workplace cite. Applicants have determined that it would be advantageous to have a fully articulatable laser robot wrist, including internally powered elements to rotate wrist members around plural drive axes, wherein a laser beam pathway may be established through the wrist, the beam pathway extending colinearly with the axes of rotation of the wrist elements. In certain drive assemblies, it may be desirable to provide full lubrication to rotary members such as, for example, gears and bearings. Additionally, in certain wrist drive mechanism, wear of parts may cause small particulate contamination of the beam pathway. In order to provide protection for a laser beam pathway operating under the aforesaid conditions, applicants have obviated the potential difficulties in such systems by a novel sealed beam design, wherein a laser robot wrist having an internal beam pathway is provided with sealed beam ducting to isolate the beam pathway from the remainder of the internal wrist mechanism.

Additionally, applicants have provided a sealed beam ductway system through an articulatable robotic wrist which may be provided with cooling fluids and the like, which are kept separate from other fluids which may be used in or about the internal robotic wrist drive parts.

It is therefore an object of the present invention to provide for a fully articulatable robotic wrist having an internal drive mechanism and an internal laser beam pathway, wherein the beam pathway has a sealed beam ductway to isolate the beam path from the wrist drive mechanism.

Another object of the present invention is to provide a means for isolating laser beam pathway fluids from other fluids which may be utilized in or about internal wrist mechanism parts.

SUMMARY OF THE INVENTION

The invention is shown contained in a laser robotic wrist having a base housing rotatable around a first wrist axis and a turret housing mounted to the base housing and rotatable around a second wrist axis. The axes are transverse to one another and intersect at a junction point. Means is provided for mounting the base housing to a laser forearm assembly and means is provided for driving the turret housing around the second axis, wherein the means for driving the housing include drive elements passing within the base housing. A mirror chamber is provided within the base housing having a mirror mounted within the mirror chamber. The junction point of the two wrist axes lies within the chamber and intercepts the mirror reflecting surface. Continuous laser beam pathway is established through the base housing, the mirror chamber, and the turret housing, the beam pathway extending colinearly with the first and second wrist axes from a beam entrance end defined on the base housing, to a beam exit end defined on the turret housing. First duct means is provided, enclosing the first wrist axis and communicating with the mirror chamber and the base housing beam entrance end. A second duct means is provided, enclosing the second wrist axis and communicating with the mirror chamber and the turret housing beam exit end. A rotary slip joint means is provided in the second duct means for permitting the turret housing to rotate with respect to the base housing while maintaining enclosure of the second wrist axes, so that the laser beam pathway is enclosed with respect to the driving elements passing within the base housing.

BRIEF DESCRIPTION OF THE DRAWINGS

FIG. 23 is a plan view of the beam switcher mechanism with cover removed.

FIG. 25 is an elevational section through the beam switcher mirror swinging drive taken along the line 25—25 of FIG. 23.

FIG. 28 is a side elevational section through the unrotating beam diverter corner assembly of FIG. 1.

FIG. 29 is an auxiliary view of the mirror adjustment assembly, taken along the line 29—29 of FIG. 28.

FIG. 30 is a side elevational section through an alternate beam diverter corner assembly.

FIG. 31 is a partial side elevational section through the beam diverter rotating corner assembly of FIG. 2.

DESCRIPTION OF THE PREFERRED EMBODIMENT

General Description of the Robot

Figure 1:
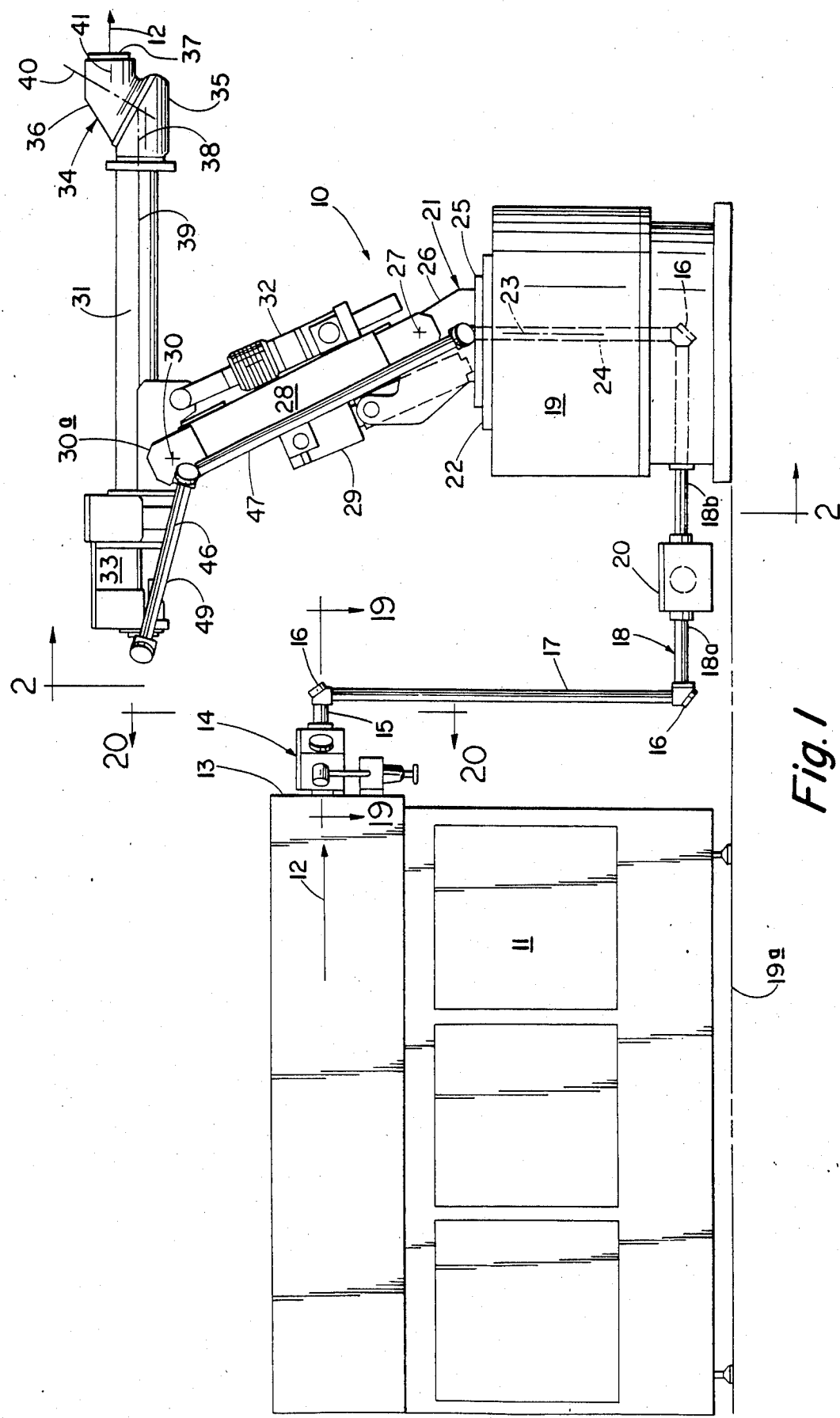
FIG. 1 is a side elevational view of a laser robot assembly, depicting a laser robot, light pipe assembly, and laser generator.

FIG. 1 of the drawings illustrates a right side elevational view of a laser robot 10 having a laser generating unit 11 mounted on a floor nesrby. The laser unit 11 may be any of a variety of industrial lasing units manufactured by companies such as Coherent General Company, Spectra-Physics, etc. The preferred laser unit 11 for many power applications is a $CO_2$ gas laser, emitting a laser beam 12 along a horizontal path from the exit end 13 of the unit 11. The beam 12 is directed into a beam combiner 14, exiting through a light pipe 15 which is a hollow tube connected to the beam combiner 14 and to a path-direction changing unit such as the laser beam diverter, or corner mirror assembly 16 shown. The beam combiner 14 will be fully discussed in conjunction with FIGS. 19 and 20, to describe how the robot is cooled and how the beam 12 is aligned. The mirror fixed assembly 16 directs the beam 12 downward along a vertical path through a light pipe 17 to a second mirror assembly 16 which redirects the beam 12 along a horizontal path through a light tube 18 into the base 19 of the robot 10. The light pipe 18 may be continuous in many applications, but for the preferred embodiment the pipe 18 may be replaced by two pipe sections 18a,b, with a beam switching box 20 located therebetween. The switching box 20 will be fully described in connection with FIG. 21.

The base 19 of the robot 10 has a shoulder unit 21 mounted to its top side 22, where the shoulder unit 21 is rotatable around a central vertical axis 23 passing through the base 19. The laser beam 12 is directed from a mirror assembly 16 within the robot base 19 upward along the vertical base axis 23 through a fourth light pipe 24. The initial four light pipes 15, 17, 18, 24 are fixed with respect to the base 19 and floor 19(a). The shoulder unit 21 of the robot 10 essentially consists of a turntable 25 swivelable on the base 19, and a bracket 26 affixed to the turntable 25 has a horizontal pivot axis 27 for supporting a brachium, or upper arm 28, of the robot 10. The shoulder unit 21 supports a drive unit 29 which powers the brachium 28 in a pivoting motion relative to the shoulder unit 20. The brachium 28 has a horizontal pivot axis 30 at its topmost end, where a special forearm 31 is journalled on the pivot axis 30 for an elbow joint 30a, so that the assembly may be flexed and extended relative to tbe base 19. The brachium 28 also carries a drive unit 32 which is connected to th brachium 28 and to the forearm 31 to provide for pivotal movement of the forearm 31. The rear end of the forearm 31 carries a drive box unit 33 for providing rotary motion to a wrist 34 carried on the forward end of the forearm 31. The wrist 34 basically consists of three parts, a base unit 35, a turret unit 36 and an end effector unit 37, each having serial roll movements which may be variously combined with one another in accordance with the drive box 33. The base unit 35 of the wrist 34 is rotatable about a first roll axis 38 coaxial with the forearm axis 39. The base unit 35 carries the turret unit 36 on a face angled with respect to the first roll axis 38 and the turret unit 36 is rotatable around the second roll axis 40 which is oblique to the first roll axis 38. The turret unit carries the end effector unit 37 or tooling plate, which is rotatable about a third roll axis 41, in turn obliquely oriented with respect to the second roll axis 40. The end effector unit 37 carries tooling unique to the work assignment.

Figure 2:
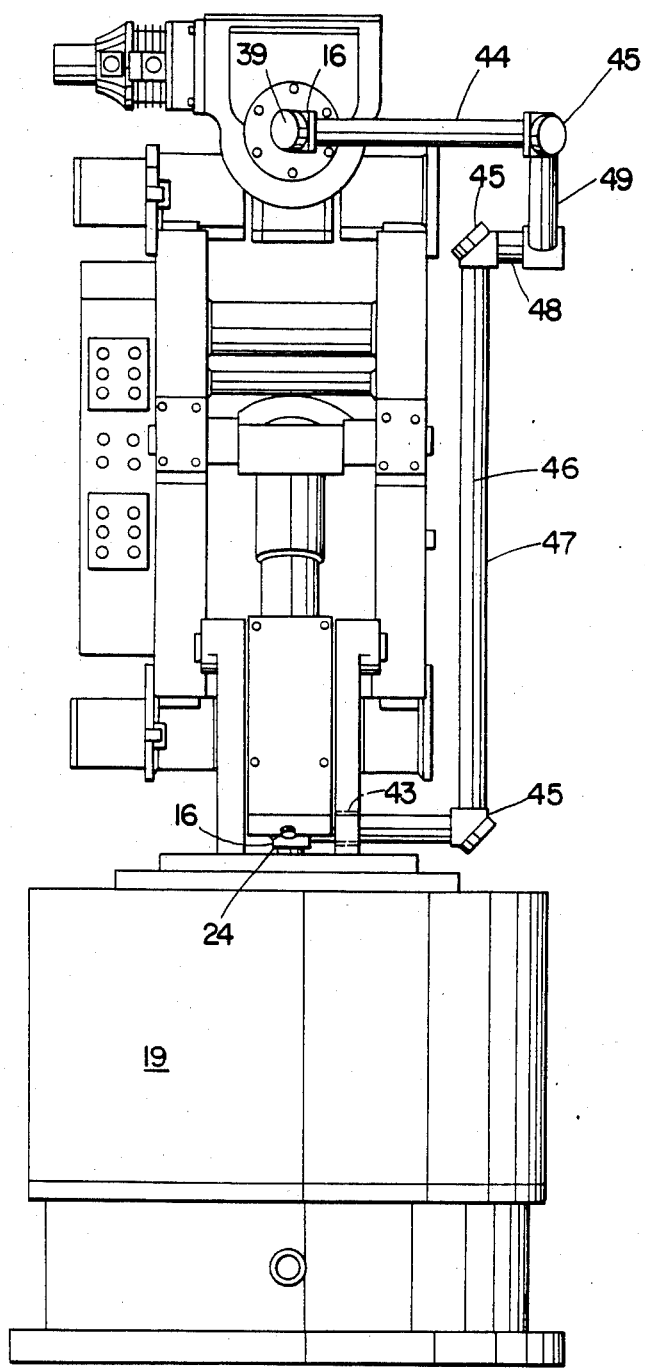
FIG. 2 is a rear elevational view of the laser robot assembly, taken along the line 2—2 of FIG. 1.
Figure 3:
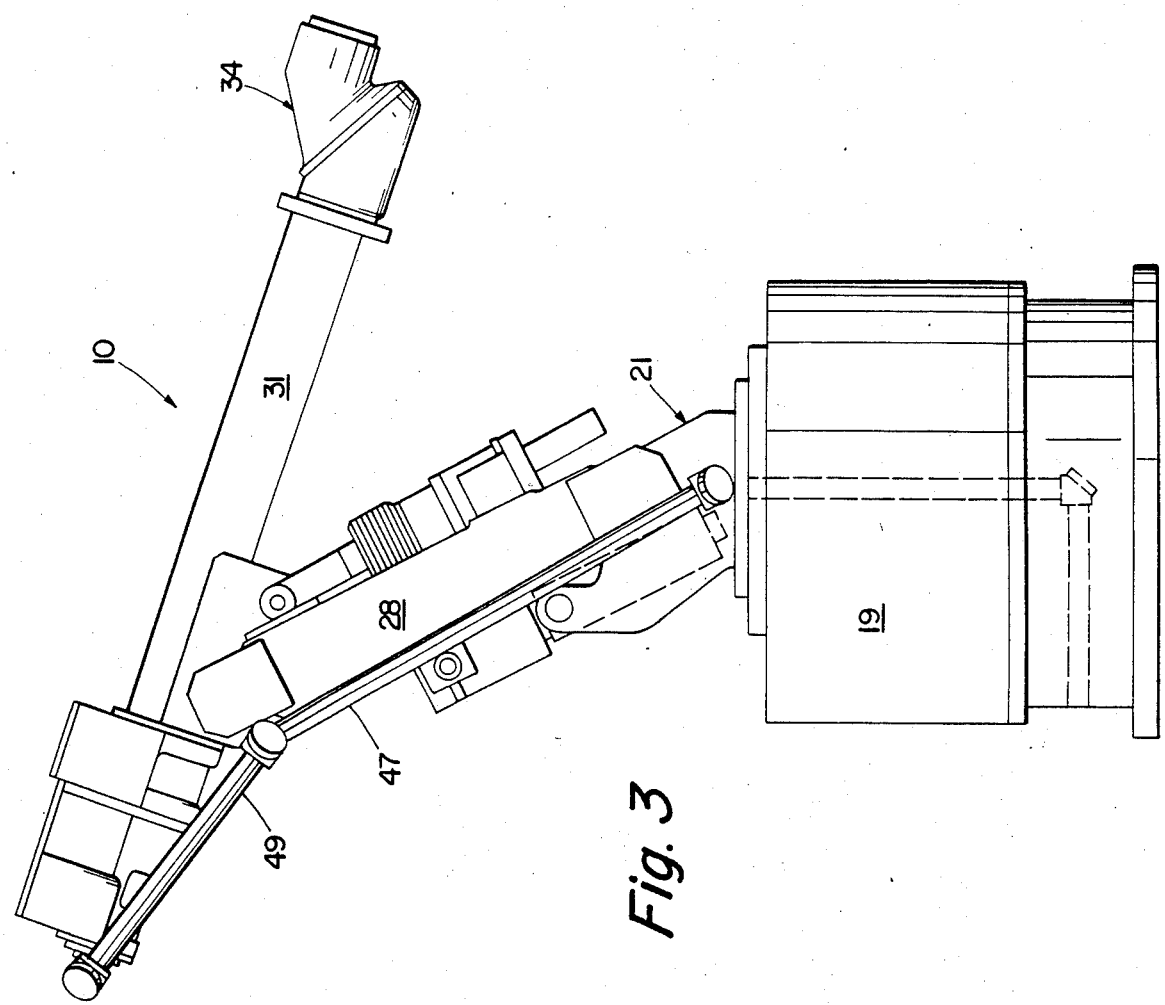
FIGS. 3-6 are side elevational views of the laser robot showing the elements moved to alternate positions.
Figure 4:
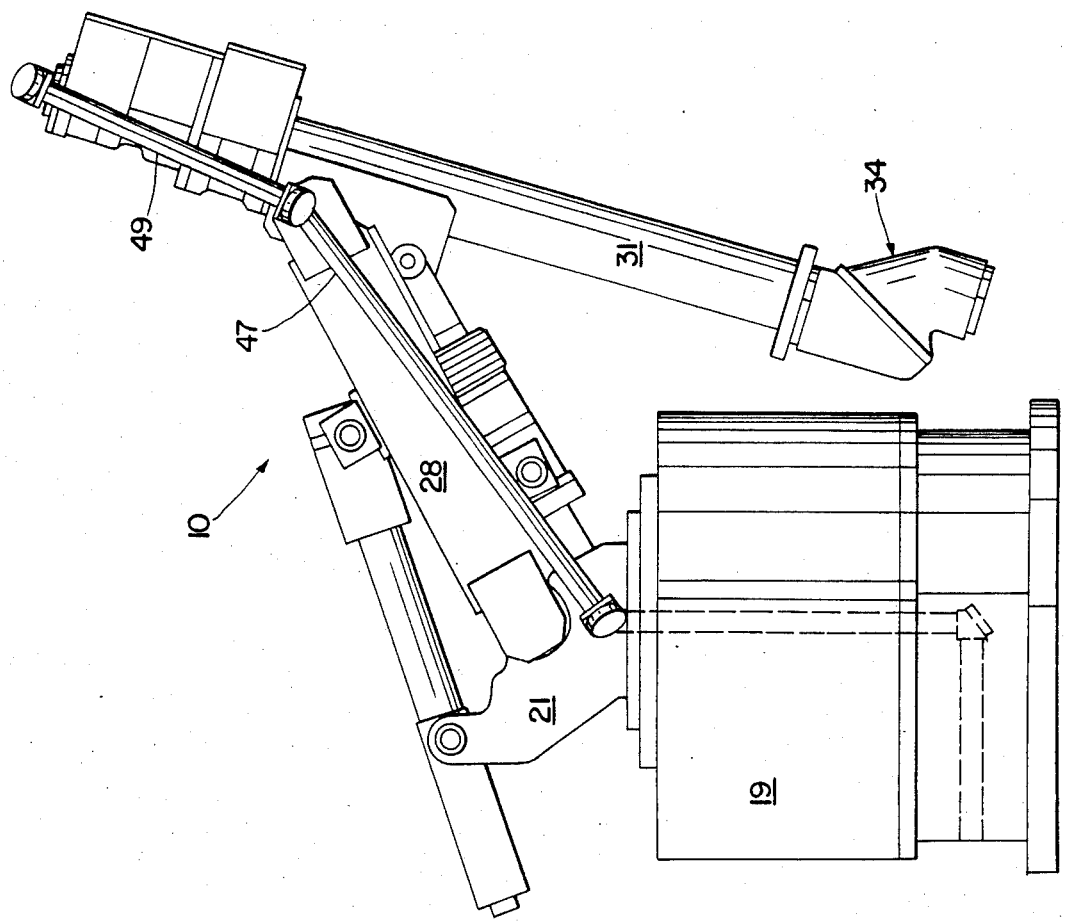
Figure 5:
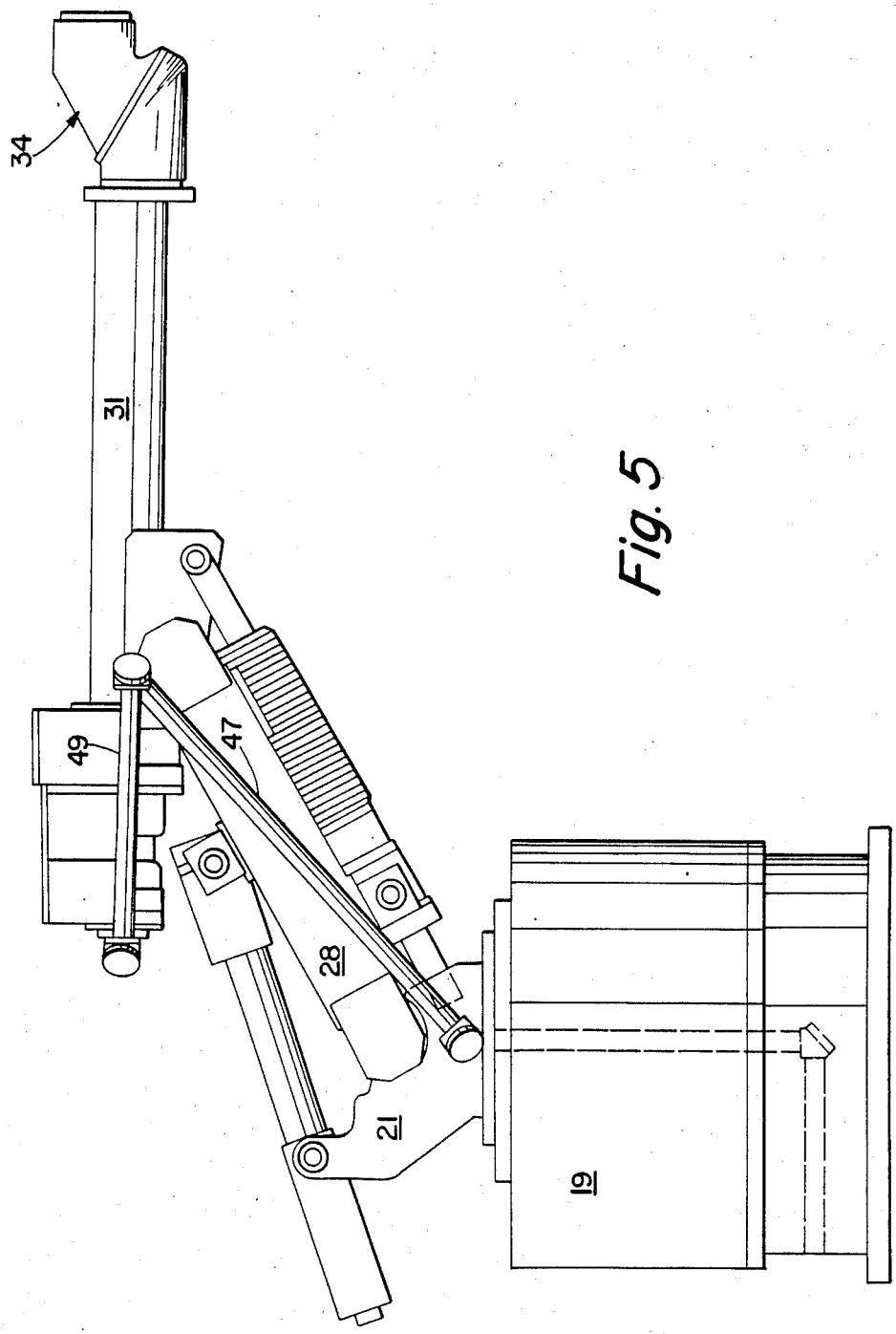
Figure 6:
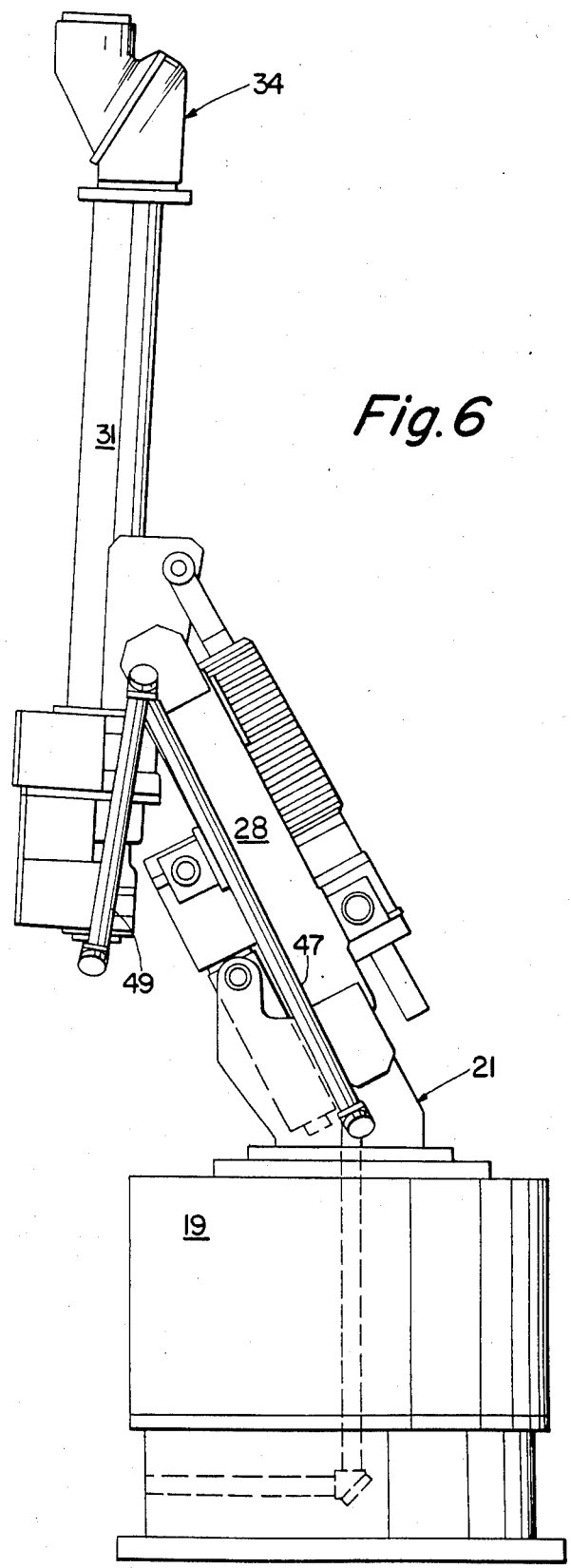

Referring to FIG. 2, in conjunction with FIG. 1, the vertical light pipe 24 extending through the base 19 is rotatably mated with a mirror assembly 16 at its topmost end, which is rigidly mounted within the shoulder bracket 26, and may rotate about axis 23 with respect to base 19. The mirror assembly 16 causes a 90° direction change of tbe beam 12 through a side-extending light pipe 42 which passes through a clearance hole 43 in the bracket 26. The upper part of FIG. 2 shows that sideextending light pipe 44 is rigidly connected to a 90° mirror assembly 16 mounted on the forearm central axis 39. The side-extending upper light pipe 44 is connected to a swivel mirror assembly 45 as is the lower light pipe 42.

In order to accomplish movement of the upper arm 28 relative to the shoulder unit 21, the light pipe assembly must be able to accommodate relative movement between the upper and lower side-extending light pipes 44,42. To accomplish the movement, FIGS. 1 and 2 illustrate that an articulate light pipe linkage 46 must span the side-extending upper and lower light pipes 44,42. The linkage 46 consists of a swivel mirror assembly 45 at the end of each horizontal light pipe having direction-changing ability to redirect the beam path 90° to the horizontal pipes. A first linkage light pipe 47 is connected to the lower swivel mirror assembly 45 and extends alongside the brachium 28 from approximately the lower pivot axis 27 to approximately the upper pivot axis 30. The upper end of tbe first linkage light pipe 47 has a swiveling mirror assembly 45 which is capable of receiving the beam 12 from the first linkage light pipe 47 and then redirecting it 90° to the horizontal axis. The swivel mirror assembly 45 of the second, horizontal linkage pipe 48 is connected to a third linkage light pipe 49 which is connected, in turn, to the swivel assembly 45 of the forearm light pipe 44. In the manner shown therefore, it may be appreciated that the forearm 31 and brachium 28 may be flexed about with respect to the shoulder unit 21 of the robot 10, and the linkage light pipes 47,48,49 will accommodate the flexing movement, as shown in FIGS. 3, 4, 5, and 6.

Figure 7:
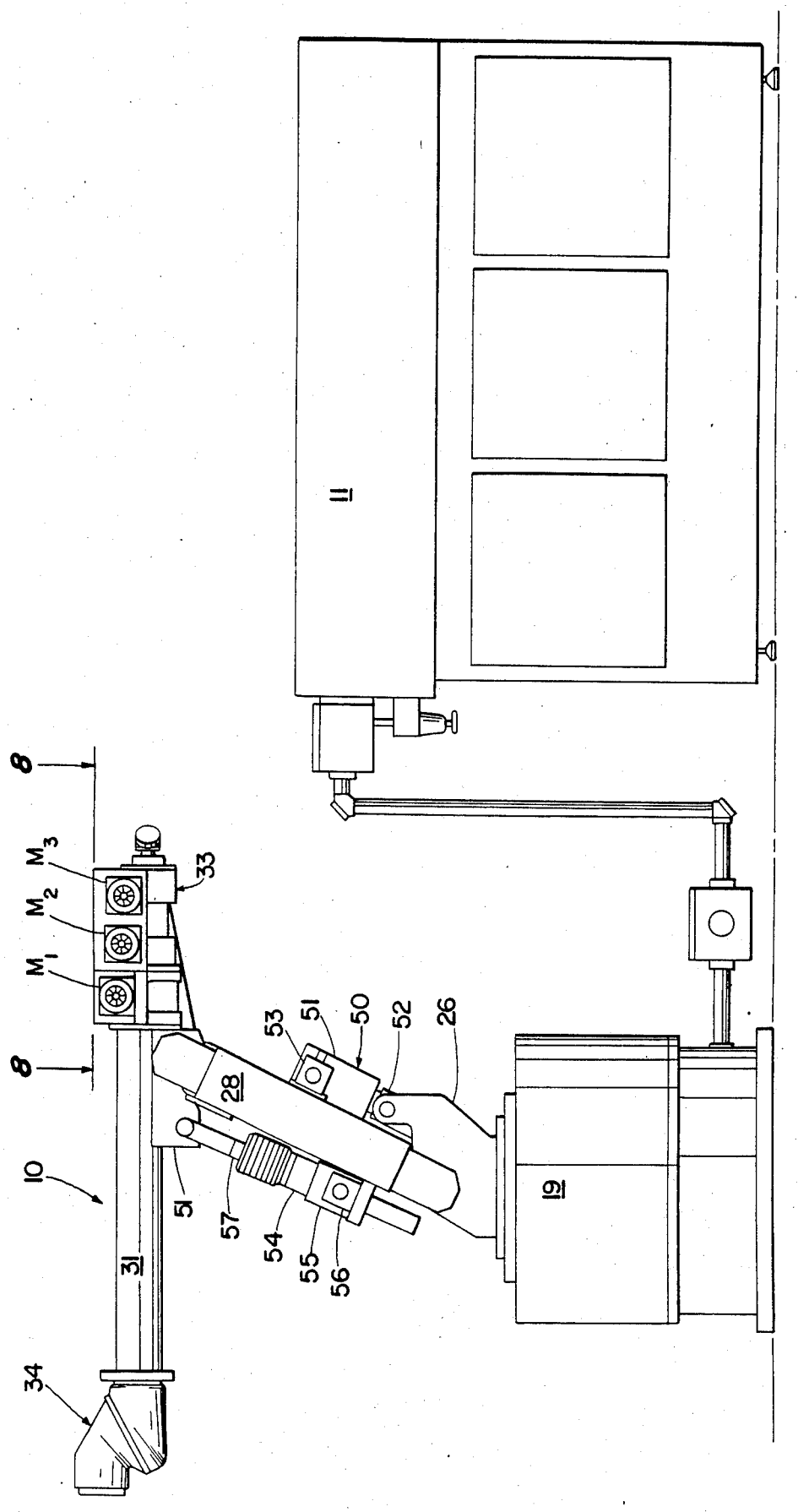
FIG. 7 is a left side elevational view of the laser robot system of FIG. 1.

FIG. 7 is the opposite side view of the robot of FIG. 1, wherein the wrist drive box 33 and motors M1, M2, M3 are depicted, corresponding to the respective roll axes. The brachium drive unit 29 consists of a screw and nut assembly 50 having an integral drive motor for powering the screw 51 relative to the nut 52. The screw 51 is pivot-mounted to a bracket 53 on the brschium 28 and the nut 52 is pivot-mounted to the shoulder joint bracket 26 so that the screw and nut travel may be accommodated while pivoting the brachium 28 relative to the shoulder unit 21. The forearm drive unit 32 consists of a screw and nut assembly 54 powered by an electric motor wherein the nut 55 is pivotally affixed to a bracket 56 on tbe brachium 28 and the screw 57 is pivotally affixed to a bracket 58 on the forearm 31 so that travel of the nut and screw may be accommodated while the forearm 31 is pivoted witb respect to the brachium 28. The side-extending drive motors M1, M2, M3 of the wrist drive box 33 serve to provide rotary motion to each of the serial roll members 35, 36, 37 of the wrist 34 with respect to the nonrotatable forearm 31.

Forearm and Elbow Joint

Figure 8:
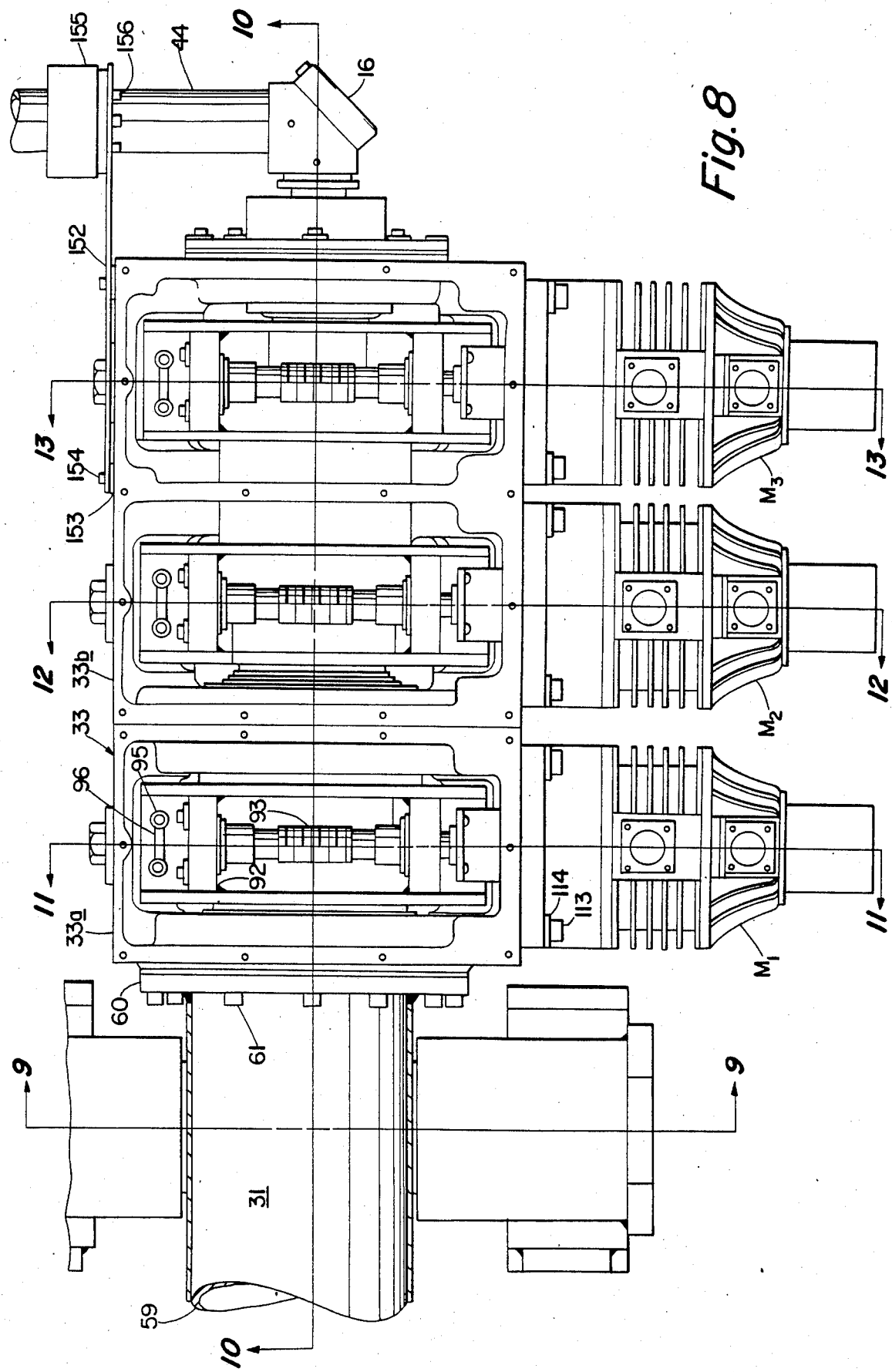
FIG. 8 is a top plan view of the wrist drive box with cover removed, taken along the line 8—8 of FIG. 7.
Figure 9:
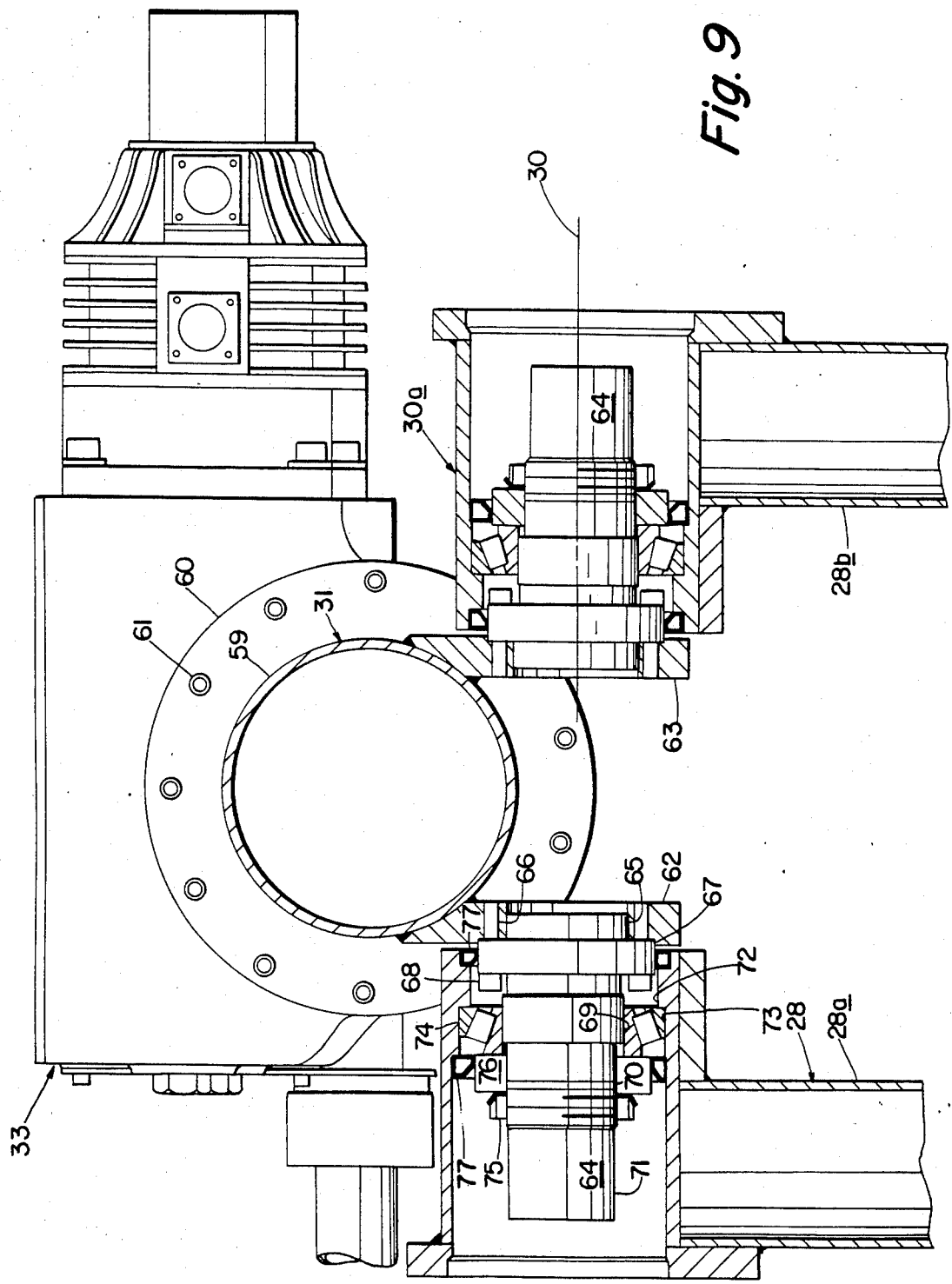
FIG. 9 is an elevational section through the forearm pivot joint taken along the line 9—9 of FIG. 8.

FIG. 8 is a plan view of the (uncovered) wrist drive box 33 which is carried by the forearm 31. The forearm 31 is nonrotating, and consists principally of a cylindrical tube 59 having an end flange 60 welded tbereto. The end flange 60 is bolted to a first drive box 33a which, in turn, carries a second drive box 33b. A plurality of cap screws 61 spaced around the flange 60 serve to hold the first drive box 33a in position. The sectional view of FIG. 9 shows the pivot axis 30 and elbow joint 30a of the robot 10. The forearm 31 has a pair of parallel, diametrically-spaced plates 62,63 extending to the same side, i.e. substantially tangential to the forearm tube 59. The plates 62,63 are bored in line, and receive a pair of stub shafts 64. The shafts 64 have a pilot diameter 65 received in the plate bore 66, and an adjacent shaft flange 67 is bolted by cap screws 68 to the plate 62,63. The shaft 64 is provided with successively stepped bearing diameter 69, thread diameter 70, and outboard end diameter 71 extending from the flange 67 into the brachium or upper arm 28. The brachium 28 has a clearance diameter 72 extending partially over the flange 67 and bearing diameter 69, and a bearing bore 73 is provided in the brachium 28 to receive the cup of a tapered roller bearing 74. The cone of the bearing 74 is received on the bearing diameter 69 of the shaft 64, and a nut 75 is received on the threaded diameter together with a seal ring 76. The nut 75 thrusts the seal ring 76 against the cone of the bearing 74. The brachium 28 contains a pair of seals 77 which bear respectively on the outer diameters of the seal ring 76 and the flange 67. Therefore, the bearing 74 may be packed with lubricant and sealed from contaminants. The outboard diameter 71 of the shaft 64 is connected to an encoder (not shown:) to provide rotational feedback signals indicating forearm position relative to the brachium 28. The brachium 28 is of bifurcated, ladder-type, construction, that is, a pair of spaced parallel square tubular members 28a,b extend from the shoulder unit 21 to the elbow joint 30a.

Wrist Drive Unit

Figure 10:
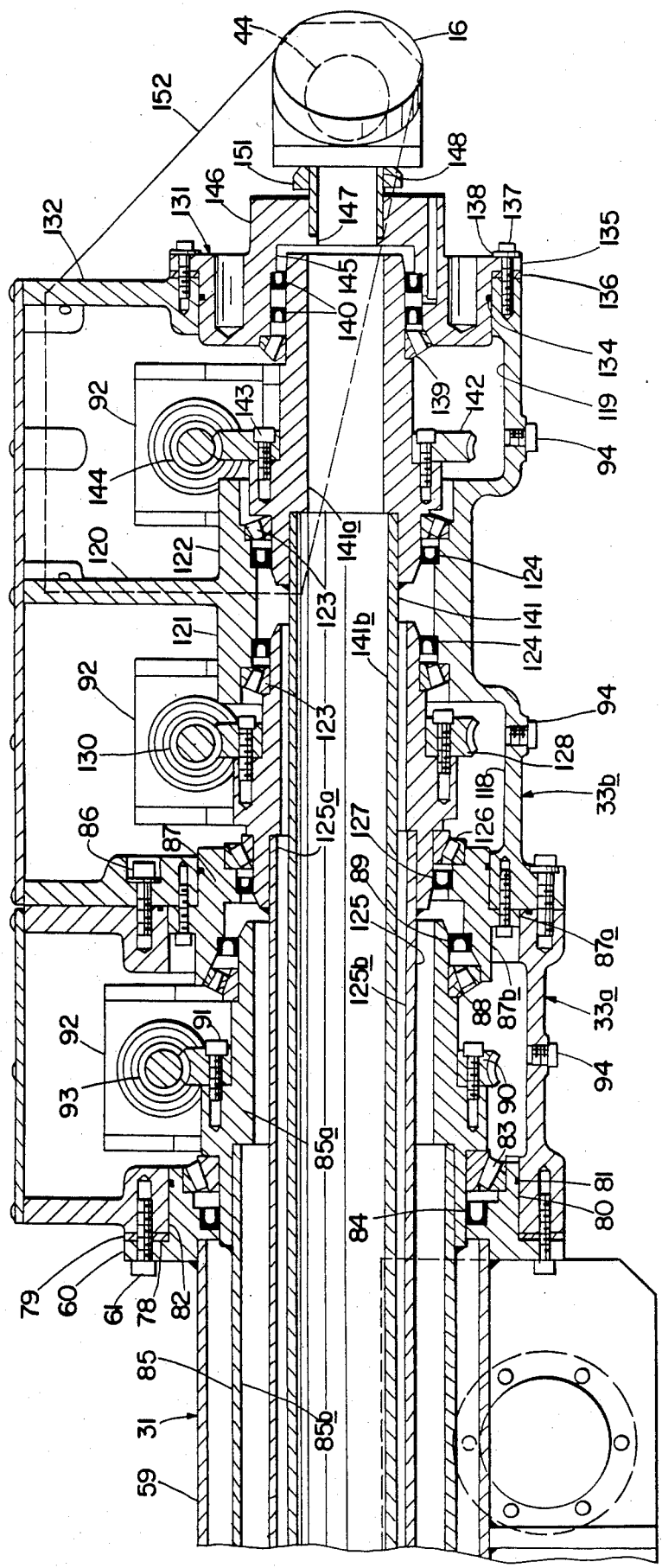
FIG. 10 is a side elevational section through the wrist drive box taken along the line 10—10 of FIG. 8.

The elevational section of FIG. 10 illustrates that the forearm flange 60 is bolted to a machined surface 78 on the first drive box 33a, and a spacer or fitting washer 79 is provided between the two. The flange 59 has a pilot diameter 80 with a concentric O-ring seal 81 received in a bore 82 in the first drive box 33a. The pilot diameter 80 supports a tapered roller bearing 83 and a cylindrical seal 84. A first drive tube 85 extends through the forearm 31 to provide the first roll movement to the base unit 35 of the wrist 34, and a hollow shaft 85a is welded to the end of the drive tube 85. The hollow shaft 85a extends generally between side walls of the drive box 33a. The hollow tube is received in the roller bearing 83 and seal 84 of the forearm flange 60.

The first and second drive boxes 33a,b, are bolted to one another by a plurality of cap screws 86, and location is provided between the two by means of a stubby locating ring 87, having its central flange 87a bolted to the second drive box 33b and piloted i the first box 33a. A short shaft section 87b extends from the flange into the first drive box 33a and supports a roller bearing 88 and seal 89. The outboard end of the first drive tube hollow shaft 85a is received in the roller bearing 88 and seal 89. Thus, the hollow shaft 85a is supported at both ends and serves to seal the interior of the first drive box 33a so that lubricant may be contained therein. A first worm wheel 90 is received on a locating diameter midspan the support bearings 83,88 of the hollow shaft 85a, and is held by cap screws 91. A worm support bracket 92 is mounted within the first drive box 33a and serves to carry a worm 93 passing across the upper portion of the worm wheel 90. The first drive box 33a has a drain plug 94 in the bottom wall so that lubricant may be removed. The plan view of FIG. 8 shows that the worm support bracket 92 is positionable by means of cap screws 95 passing through an adjusting slot 96 and received in the drive box 33a.

Figure 11:
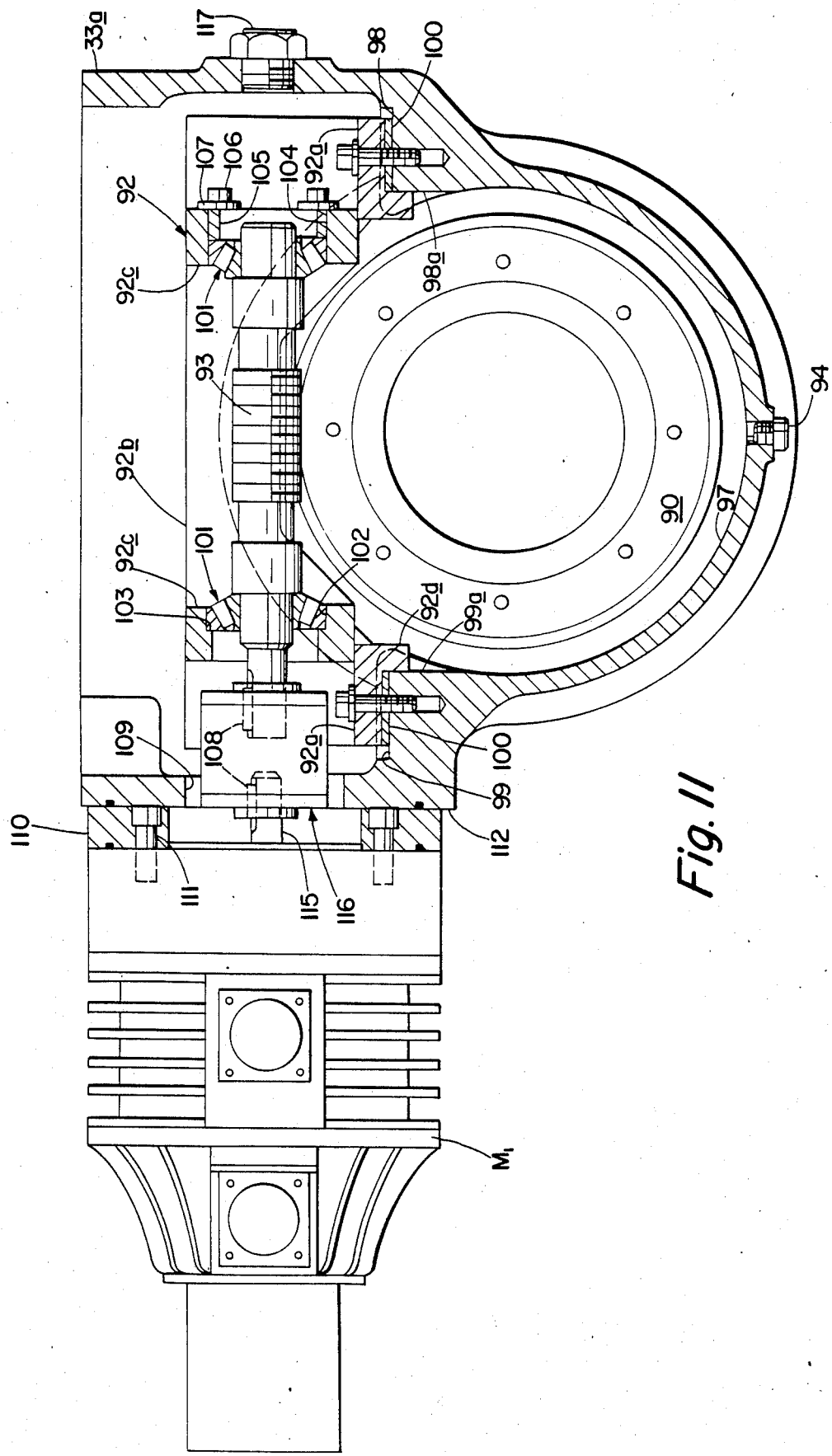
FIGS. 11-13 are rear elevational sections through the wrist motor drive assemblies, taken along the lines 11—11, 12—13—13, of FIG. 8.

FIG. 11 shows that the first drive box 33a has a radius wall section 97 conforming to the worm wleel 90, and a pair of side pads 98,99 are machined in the drive box 33a to serve as a mounting for the worm support bracket 92. The worm support bracket 92 is a fabricated assembly, having foot plates 92a extending across the mounting pads 98,99. The foot plates 92a are situated on shim plates 100 which are ground to adjust the centerline of the worm 93 with respect to the worm wheel 90. The worm support bracket 92 has parallel side plates 92b extending across the span of the foot plates 92a, and end plates 92c secured to both the side plates 92b and foot plates 92a serve as bearing supports. Each end plate 92c has a bearing bore to receive the cup of a tapered roller bearing 101. The first bearing bore 102 (nearest the drive end) is machined to a shoulder 103 within the end plate 92c, while the second bearing bore 104 is machined through the other end plate 92c. The worm 93 is provided with end bearing diameters and adjacent shoulders to be received with the bearings 101. The bearings 101 are loaded against one another by means of a loading ring 105 received in the second bearing bore 104 and held in position by a plurality of cap screws 106 and washers 107 received with the second end plate 92c. The drive end of the worm 93 is provided with a key 108. The side wall of the drive box 33a has a clearance bore 109 at the drive end of the worm 93 where the first roll drive motor M1 is affixed to a mounting plate 110 by a plurality of cap screws 111. The mounting plate 110, in turn, is affixed to the outer surface 112 of the drive box 33by screws 113 and washers 114 (FIG. 8), with the shaft 115 of the motor M1 in line with the worm 93. The motor shaft 115 is provided with key 108, and a commercial coupling 116 serves to connect the motor shaft 115 and worm 93. The horizontal mounting pads 98,99 in the drive box 33a have adjacent vertical walls 98a, 98b and downwardly-extending sections 92d and of the foot plates 92a are slidably fitted thereto and serve to transmit the end thrust of the worm 93 directly to the drive box structure. The opposite side of the drive box 33a is provided with a sight gage 117 so that lubricant level may be detected.

Referring back to FIG. 10, the second drive box 33b is seen as a cast member having dual cavities 118,119 formed by a central wall 120 and cast bosses 121,122 within the drive box 33b. The two cavities 118,119 have drain plugs 94 at their bottommost points. The first cavity 118, adjacent the first drive box 33a, has a bearing 123 and a seal 124 mounted within the cast boss 121 adjacent the central wall 120. A second drive tube 125 extends through the bore 85b of the first drive tube 85, to provide the second roll movement to the turret unit 36 of the wrist 34, and a hollow shaft 125a is welded to the end of the second drive tube 125. The hollow shaft 125a is received in bearings 123, 126 and seals 124, 127. Respectively, mounted in the boss 121 and locating ring 87. A second worm wheel 128 is mounted to the shaft 125a against a shoulder mid-span the bearings 123,126 and cap screws 129 connect the worm wheel 128 to the shaft 125a. A second worm 130 passes across the upper portion of the worm wheel 128 and is mounted in a worm support bracket 92.

Figure 12:
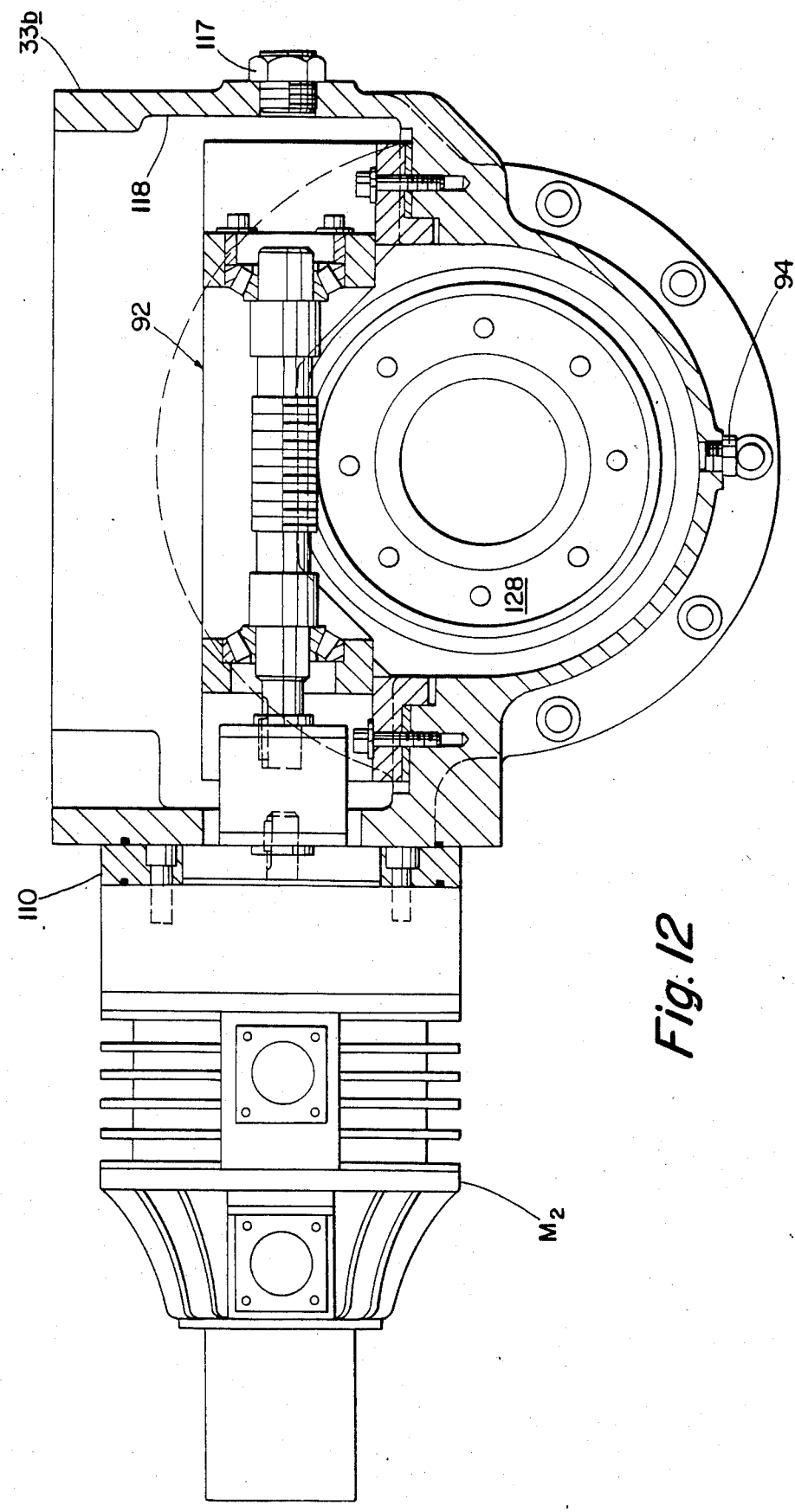
Figure 13:
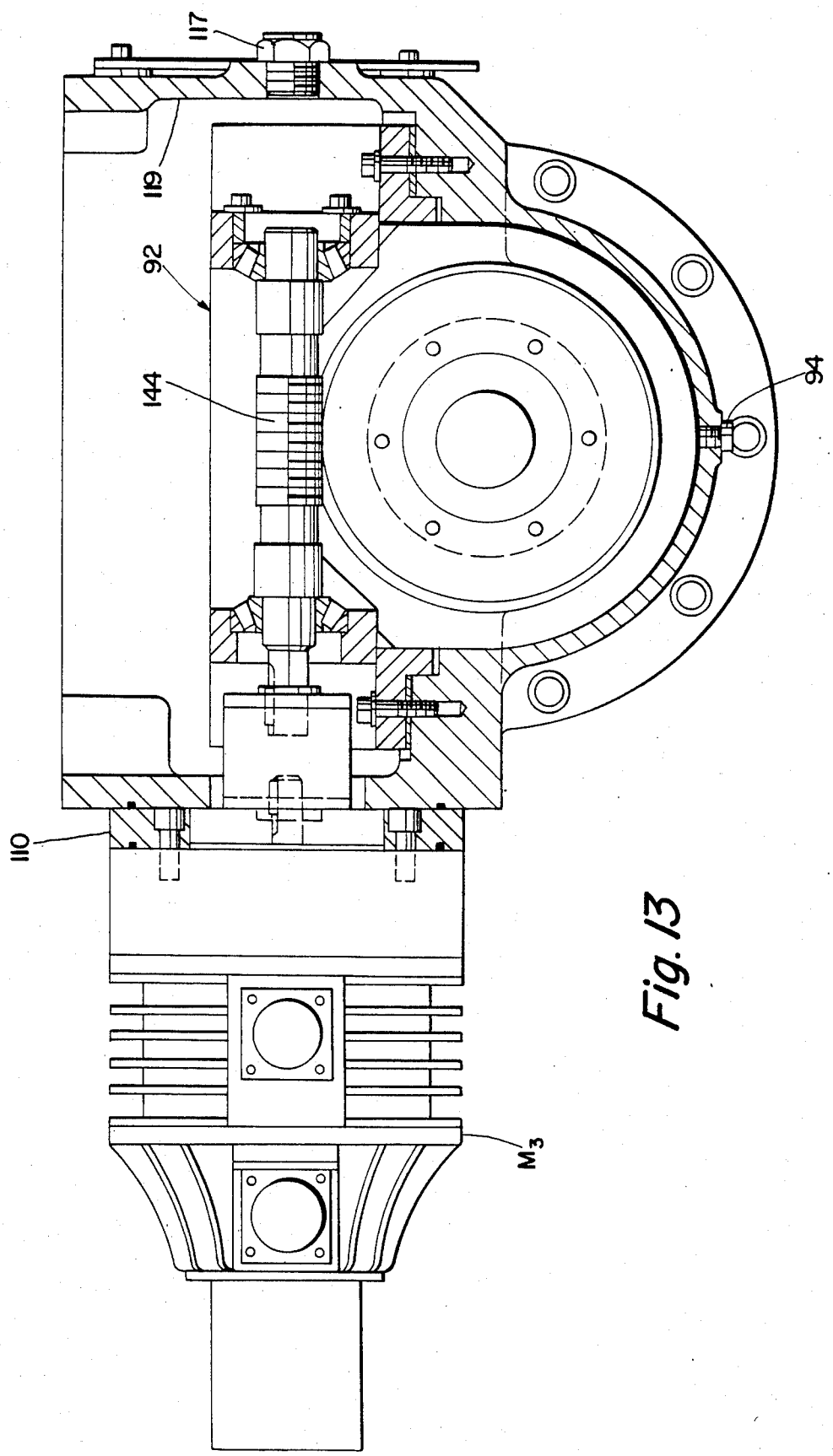

The end cavity 119 of the second drive box 33a likewise has bearing 123 and seal 124 within the boss 122 adjacent to the central wall 120. An end mounting plate 131 is received in the outer wall 132 of the drive box 33b. The mounting plate 131 has a pilot diameter 133 sealed by an O-ring 134 within the drive box wall 132. A flange 135 is received against a fitting washer 136 and is secured by plurality of cap screws 137 and washers 138. A bearing 139 and twin seals 140 are mounted in the interior face of the end mounting plate 131. A third drive tube 141 extends through the bore 125b of the second drive tube 125 and serves to provide the third roll movement of the end effector 37 of the wrist 34. The third drive tube 141 is welded to a short, hollow shaft 141a in a manner similar to that of the first and second drive tubes 85,125 and the hollow shaft is received in bearings 123,139 and seals 124,140 respectively mounted in the boss 122 and end mounting plate 131. A third worm wheel 142 is mounted to the hollow shaft 141a against shoulder mid-span the bearings 123,139 and affixed thereto by cap screws 143. A third worm 144 passes across the upper portion of the worm wheel 142 and is carried in a worm support bracket 92 within the second cavity 119. Referring to FIGS. 12 and 13, the second and third worms 130,144 are mounted in their respective brackets 92 in an almost identical fashion to that of the first worm 93. The second and third drive motors M2,M3 are received with mounting plates 110 which are in turn affixed to the second drive box 33b. A sight gage 117 is provided at each cavity 118,119 to indicate the level of lubricant. A counterbore 145 in in the end mounting plate 131 serves as a clearance relief around the end of the third hollow shaft 141a. A reduced-diameter extension 146 is provided on the plate 131 adjacent the flange 135, and a central clearance hole 147 runs through the extension 146 and a tube 148 which is threadably received with the extension 146. Thus, fluid communication may be had between the hollow threaded tube 148 and the third drive tube 141. As will be discussed later, a cooling fluid, such as air, may be circulated through the threaded tube 148. To prevent mingling of the internal lubricant of the drive box 33 with a cooling fluid, the twin spaced-apart fluid seals 140 are received with the seal diameter 149 of the hollow shaft 141a. An internal drain groove 150 is provided within the end plate 131 between the seals 140 and a vent hole is drilled in the end plate extension 146 to connecting the drain groove 150 to the outside. The seals 140 are turned with their lips facing in opposite directions to provide the most positive sealing for fluid directed against the seals 140. Any slight leakage which may escape the drive box 33b will therefore drip into the drain groove 150 and be vented to the outside rather than mixing with the cooling air of the robot 10. The cooling air must be kept contaminant-free to provide for the best transmission of the laser beam 12 through the drive tubes. The threaded tube 148 supports a 90° mirror assembly 16 which is affixed to the tube 148 by a lock nut 151. The upper side-extending light pipe 44 is shown (with hidden lines) extending through a hanger bracket 152 affixed to the outside of the second drive box 33b.

Referring to FIG. 8, the hanger bracket 152 is secured to bosses 153 on the second drive box 33b by a plurality of cap screws 154, and the outboard portion of the hanger bracket 152 has a tubular support collar 155 sized to fit the light pipe 44 and held to the hanger bracket 152 by a plurality of cap screws 156.

Wrist Unit

Additional references, i.e. left, upper, horizontal, etc. are made for convenience only in following the respective moved through a wide variety of spatial orientation.

Figure 14:
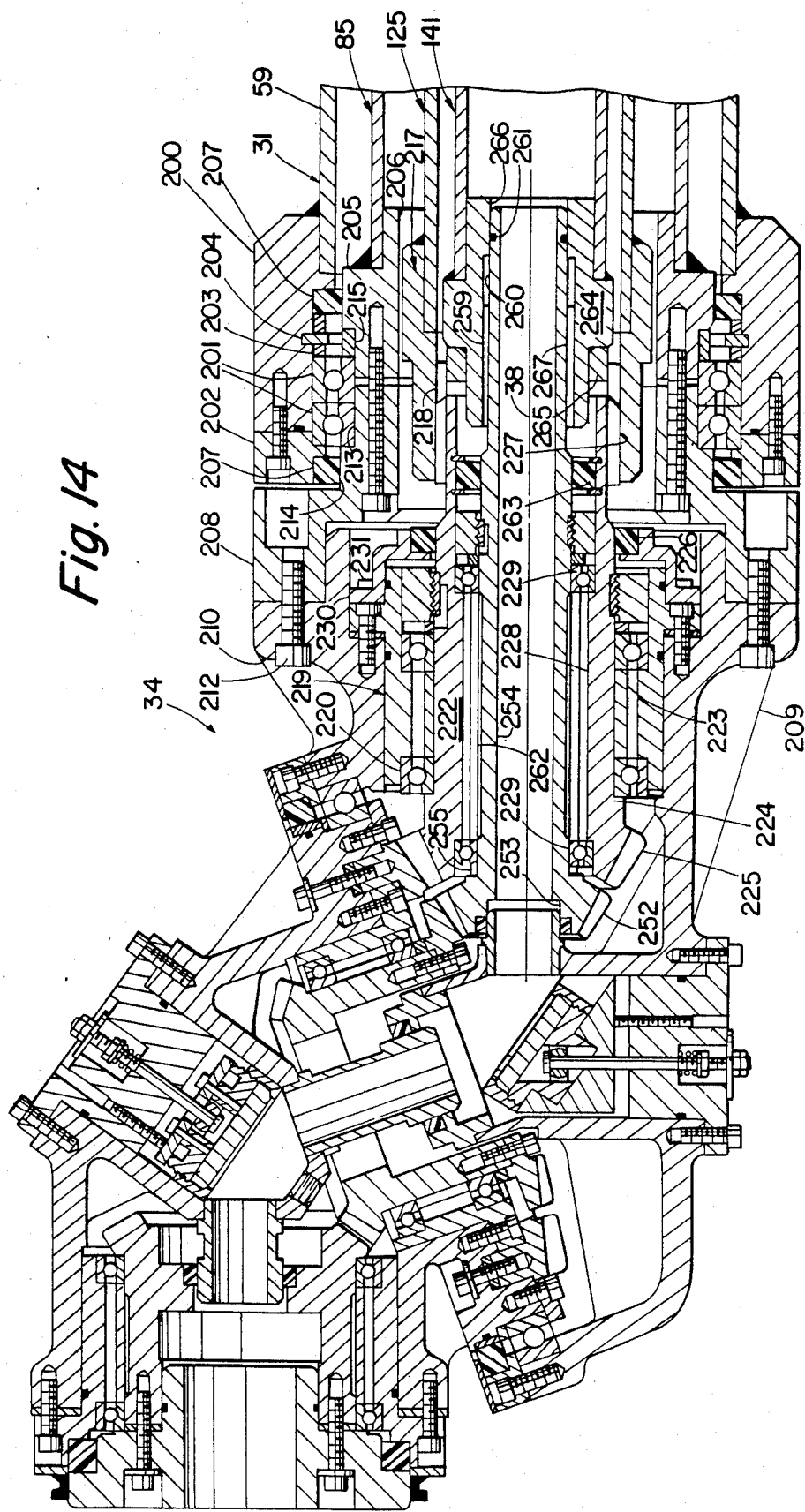
FIG. 14 is a left side elevational section of a laser wrist having three roll axes and a sealed beam path.
Figure 14A:
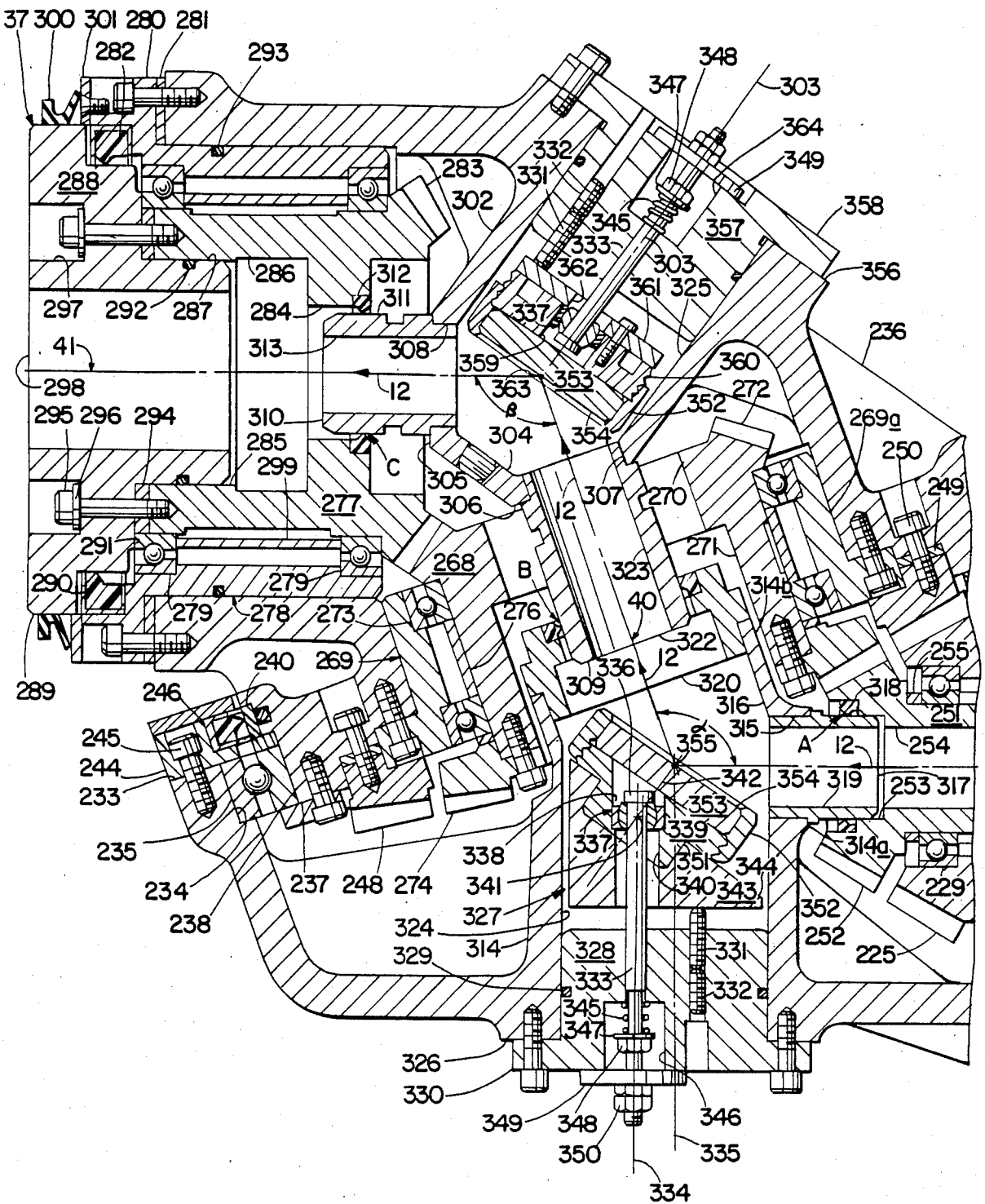
FIGS. 14a and b are enlarged sections through the elements of FIG. 14.
Figure 14B:
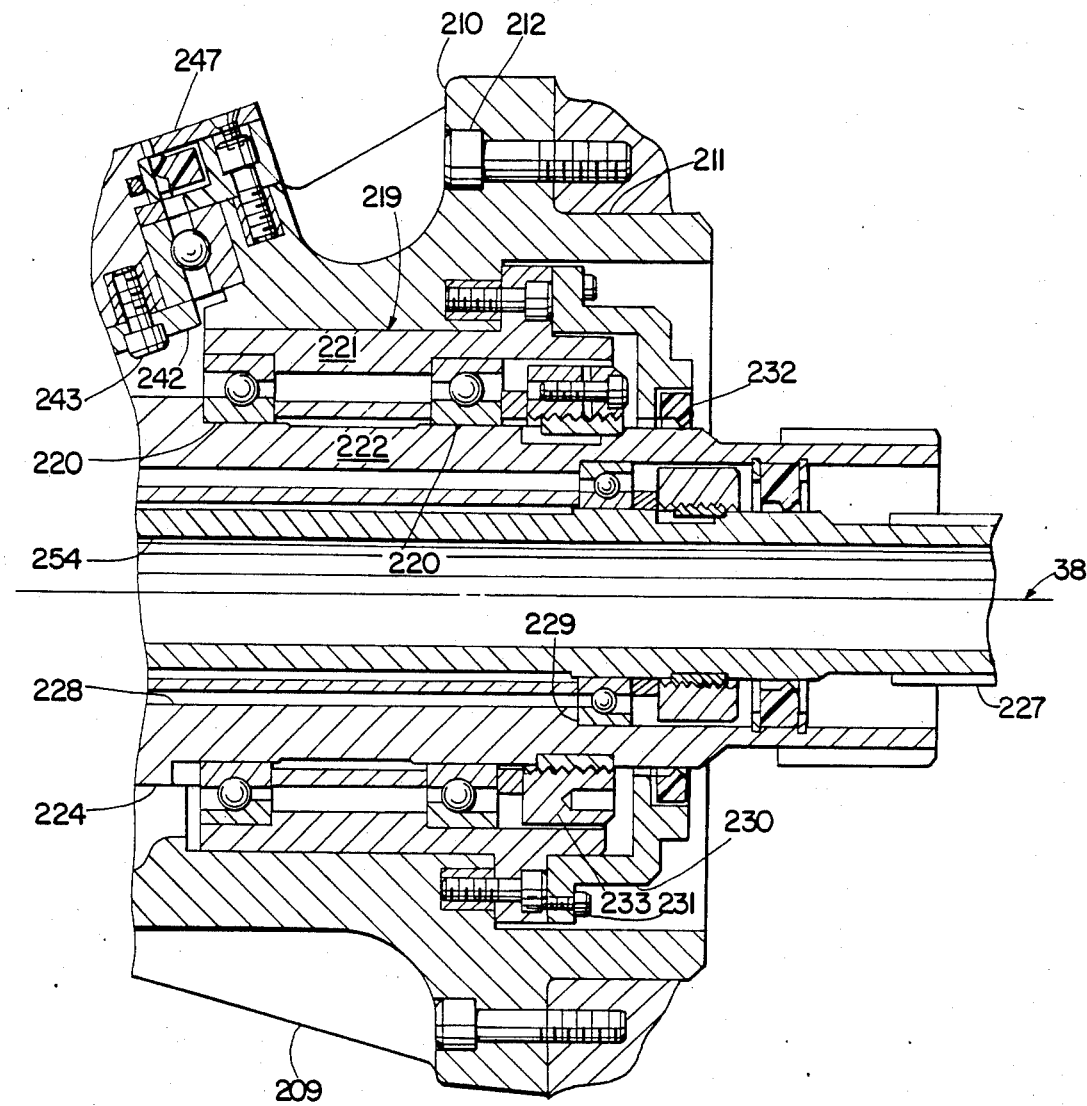

Referring to FIG. 14, and the enlarged views of FIGS. 14a,b, the non-rotating forearm 31 of FIG. 10 concludes at an enlarged tube head 200 welded to the tube 59. The head 200 supports a pair of angular contact ball bearings 201. The bearings 201 are held in the tube 200 by a bearing retainer cap 202 fastened to the front of the head 200, and loading the bearings 201 against an internal spacer 203 seated against an internal snap ring 204. The end of the first drive tube 85 is welded to a tube head 205, which is piloted inside the drive tube 85 and has a central clearance hole 206. The outer diameter of the tube head 205 is smoothly finished and provided with a slight entry taper to ride in a seal 207 carried by the forearm tube head 200. The first drive tube head 205 is connected to the wrist 34 by means of a base unit adapter ring 208. The base housing 209 of the wrist 34 is a casting having a mounting flange 210 and adjacent pilot diameter 211. The pilot diameter 211 is received in the adapter ring 208 and cap screws 212 secure the flange 210 to the ring 208. The adapter ring 208 has a bearing diameter 213 on its opposite side terminating at a shoulder diameter 214 which is adjacent to the outer diameter of the adapter ring 208. A clearance bore 213a is provided through the center of the ring 208 in line with the clearance hole 206 of the first drive tube head 205. A plurality of cap screws secure the adapter ring 208 to the drive tube 85. The tube head 205 and adapter ring 208 are both received in the angular contact bearings 201 carried by the forearm 31. A spacer 215 is received on the bearing diameter 216 of the tube head 205 against the inner races of the angular contact bearing 201. A second seal 207 is received in the front of the bearing retainer cap 202 and is in rotating contact with the shoulder diameter 214 of the adapter ring 208, to protect the bearings 201 from outside contaminants.

For assembly reasons, the adapter ring 208 is secured to the bearings 201 and first drive tube 85 before the base housing 209 is mounted to the adapter ring 208. But, for practical purposes, it may be assumed that the adapter ring 208 and base housing 209 function as if they are integral with one another.

Actuation of the first drive motor M1 (see FIG. 8) causes rotational movement of the first drive tube 85 with respect to the nonrotating forearm 31 and, consequently, the entire wrist 34 is rotated with the base housing 209. The second drive tube 125 of FIG. 10 extends concentrically within the first drive tube 85, and has an internally splined tube head 217 welded to the end of the tube 125. The tube head 217 has an outer diameter sized to fit easily through the clearance bore 206 in the first drive tube head 205. A rear counterbore is provided in the tube head 217 to fit closely over the second drive tube 125, for welding. The front of the tube head 217 has a reduced outer diameter and an internal spline 218 is machined centrally through the tube head 217. The base housing 209 supports internal bearing package 219 consisting of spaced-apart angular contact ball bearings 220 carried in a flanged bearing sleeve 221. The bearings in turn, carry a drive spindle 222. The spindle 222 has a main bearing-supported diameter 223, and an adjacent shoulder 224 on the interior end blends to a first bevel gear 225 machined about the end of the spindle 222. The bearing diameter 223 concludes at a threaded portion which is subsequently reduced to a seal diameter 226. The threaded portion maintains a bearing locknut 233. The seal diameter 226 continues for a short length and is tapered down to smaller external splines 227. A clearance hole 228 is provided through the spindle 222 and a first, shallow depth bearing bore supports a bearing 229 in the gear end of the spindle while a second, longer depth bearing bore supports a bearing 229 in the splined end of the spindle 222. A seal ring 230 is received on the bearing sleeve 221 and held therewith by a plurality of cap screws 231, and the seal ring 230 contains a seal 232 which runs with the spindle seal diameter 226 to isolate the bearing package 219 from rear portions of the assembly. When the base housing 209 is affixed to the adapter ring 208, the external splines 227 are slipped into engagement with the internal splines 218 of the second driver tube 125. The central first roll axis 38 of the wrist base housing 209 is concentric with the axis 39 of the forearm 31.

The base housing 209 has a machined 233 face normal to a second roll axis 40 which is angled relative to the central first roll axis 38 of the housing 209. It may be appreciated that, while the preferred embodiment of FIG. 14 depicts the first and second roll axes 38,40 as being obliquely oriented to one another, they may be constructed at right angles, as well. A bearing bore 234 is machined in the face 233, concentric with the second roll axis 40, and contains a single turntable bearing 235 which is used to provide antifriction support for the turret bousing 236 of the wrist 34. The turret housing 236 is a cast body having a bottom face 237 in line with the inner race of the turntable bearing 235. A bearing diameter 238 on the housing 236 is received in the turntable bearing 235 extends to a shoulder 239 which is adjacent to a seal ring 240 fitted on the housing 236. A fitting washer 241 is received between the shoulder 239 and bearing 235, and the turret housing 236 is secured to the bearing 235 by a bearing clamp ring 242 held to the bottom face 237 by cap screws 243. The outer race of the turntable bearing 235 is secured in position with the base housing by a bearing retainer 244 affixed to the oblique face 233 of the base housing 209 by a plurality of cap screws 245. The top side of the bearing retainer 244 contains a seal 246 mounted in sealing contact with the seal ring 240 of the turret housing 236. A thin outer cover plate 247 is secured to the outer surface of the bearing retainer 244 to secure the seal 246 in position and to help exclude contaminants. A second bevel gear 248 is pilot-mounted into the bottom face 237 of turret housing 236 and backed up by a fitting washer 249. A plurality of cap screws 250 are provided from the upper side of the turret housing 236 to secure the second bevel gear 248. The second bevel gear 248 is in mesh with the first bevel gear 225 of the spindle 222 carried in the base housing 209. Therefore, it can be seen that rotation of the second drive tube 125 causes rotation of the base housing spindle 222 about the first roll axis 38, and simultaneous rotation of the turret housing 236 about the second roll axis 40. The rotation of the turret housing, of course, causes the end effector 37 to rotate around the second roll axis 40, as well.

A second tubular spindle 251 is rotatably carried about the first roll axis 38 by a concentric mounting within the bearings 229 contained in the first tubular spindle 222. The inner end of the second tubular spindle 251 has an integral bevel gear 252 and a central counterbore 253. A bore 254 is provided through the entire length of the second tubular spindle 251. The second tubular spindle 251 is shouldered against a fitting washer 255 at the inboard bearing 229, and the spindle 251 extends through both bearings 229 and concludes at a threaded portion which maintains a locknut 256 and washer 257. The spindle 251 is further reduced to a smooth seal diameter 258 and adjacent, exterior splines 259. The exterior splines 259 are further reduced to a seal diameter 260 containing an O-ring 261. A spacer tube 262 is carried on the spindle 251 between the inner races so that the bearings 229 will not be overloaded in assembly. A cylindrical seal 263 carried in the bearing bore of the first spindle 222 is in sealing contact with the seal diameter 258 of the second spindle 251.

The third drive tube 141 shown in FIG. 10 extends concentrically within the second drive tube 125, and terminates at a tube head 264 similar in design to the second drive tube head 217. The tube head 264 is piloted within the third drive tube 141, and a central flange abuts the end of the tube where it is welded. The forward end of the head 264 has a reduced diameter upon which is mounted a support ring 265, closely fitted within the interior splines 218 of the second tube head 205 to support and guide the tube 141 when the wrist 34 is removed. The third tube head has a smooth fitting bore 266 received on the seal diameter 260 and O-ring 261 of tbe spindle 251, and has interior splines 267 machined to fit with the exterior splines 259 of the spindle 251. Thus, when the base housing 209 of the wrist 34 is affixed to the adapter ring 208 and the first spindle splines 227 are received with their mating splines 218, the second spindle splines 259 will also be received in their mating interior splines 267.

A third spindle 268 is rotatably carried in a bearing pack 269 mounted within the turret housing 236 concentric with the oblique second roll axis 40. The spindle 268 has a central clearance bore 270 and downward-opening counterbore 271, and a fourtb bevel gear 272 is machined on the top end of the spindle, i.e. adjacent to the upper bearing 273 of the bearing pack 269. The bearing retainer 269a is a flanged cylindrical member received in a smooth bore in the turret housing 236 and held by screws. The spindle 268 extends through both bearings 273, beyond the lowermost bearing 273. A second bevel gear 274 is received on tbe spindle 268 against a fitting washer 275 and lower bearing 273 and held to the spindle 268 by cap screws. The bevel gear 274 thus also serves as a bearing retainer and is used to load the bearings 273 against a tubular bearing spacer 276. The lower bevel gear 274 has a central bore equipment to the spindle counterbore 271 and is in mesh with the gear 252 of the second spindle 251.

A fourth spindle 277 is also carried in a bearing pack 278 and rotatable about the third roll axis 41, which is oblique to the second roll axis 40, in the turret housing 236 by the bearing pack 278 comprises a pair of spaced-apart bearings 279 mounted in opposite end bores of a flanged bearing retainer 280, and the retainer 280 is closely fitted into a bore in the turret housing 236. The bearing retainer 280 is seated against a fitting washer 281 on the front face of the turret housing 236. The retainer carries a seal 282 in front of the outer bearing 279. The inner end of the spindle 277 is provided with a bevel gear 283 which is enmeshed with the upper bevel gear 272 of the third rotatable spindle 268. The spindle 277 is step counterbored at the gear 283, around a central clearance bore 284. The spindle 277 extends into the outer bearing 279 and is provided with a smooth entry bore 285, increasing to a central relief diameter 286 terminating at the approximate axial midpoint of the spindle 277. The smooth bore 285 receives the pilot 287 of an end effector tooling plate 288. The end effector plate 288 has an outer flange 289, stepping down to a seal diameter 290, which is received in the bearing retainer seal 282. The seal diameter 290 is further reduced to a face-relieved bearing surface 291 which abuts the outer bearing 279 of the bearing pack 278, and terminates at the smaller pilot 287. The pilot 287 and main diameter of the bearing retainer 280 each have a circumferential O-ring seal 292,293. A fitting washer 294 is placed between the end of the spindle 277 and the bearing surface 291 of the end effector plate 288 to prevent over-tightening, and a plurality of clamping screws 295 are provided through the washers 296 received in clearance counterbores 297 in the front face 298 of the end effector plate to secure the plate 288 to the spindle 277. A bearing spacer 299 is provided over the spindle 277 between the inner races of the spaced-apart bearings 279. An outer dust seal 300 bears on the O.D. of the end effector flange 289 and a wear plate 301 on the front face of the bearing retsiner 280.

A hollow cylindrical internal boss 302 on the cast turret housing 236, extends into the area formed between tbe angled spindles 268,277. the centerline 303 of the boss 302 bisects the included angle beta between the second and tbird roll axes 40,41. The inner end 304 of the boss 302 is closed, and has two flat, symmetrical faces 305,306 normal to the respective axes 40,41. The faces 305,306 are provided with a pair of bores 307,308 at the 5 o'clock and 9 o'clock positions, coaxial with the respective second and third roll axes 40,41, respectively, and a pair of seal tubes 309,310 extend from the boss 302 colinearly with the roll axes 40,41. The first seal tube 310 is tightly received in the bore 308 of the housing boss 302 and has a seal diameter 311 extending through a tube seal 312 in the counterbored fourth spindle 277. The seal tube 310 has a central clearance hole 313 so that an unobstructed path is formed along the third roll axis 41 through the spindle 277, end effector plate 288, and seal tube 310.

A hollow, generally cylindrical boss 314 on the cast base housing 209, normal to the first roll axis 38, extends into the area formed between the second and third spindle 251,268. The boss 314 branches into two side bosses 314a,b, at the 3 o'clock and 11 o'clock positions, having bores 315,316 coaxial with the first and second roll axes 38,40 respectively. The first bore 315 receives a seal tube 317 which is pressed into the bore 315 and has a seal diameter extending into a seal 318 carried in the second spindle 251. A central clearance hole 319 through the seal tube 317 serves to provide an unobstructed path along the first roll axis 38 through the second spindle 251 and seal tube 317, to the interior of the base housing boss 324. The second bore 316 of the base housing boss 314 contains a hollow support sleeve 320 which carries a tube seal 321. A seal tube 322 pressed into the bore 307 of the turret housing boss 302 extends through the tube seal 321 of the base housing 209. The seal tube 322 has a central clearance hole 323 so that an unobstructed path is maintained through the seal tube 322 and support sleeve 320, interconnecting the bores or interior chambers 324,325 of the turret housing boss 302 and base housing boss 314.

The three rotary slip joints A, B, C, are therefore created along the first, second and third roll axes 38, 40, 41, so that an interior besm path may be completely isolated from the gear drive mechanism of the wrist 34. The isolation of the mechanism from the interior path is desirable, in many cases, because lubricant in the form of liquids, dry solids, oil mist, etc., may interfere with the transmission of the laser beam 12.

The outer surface 326 of the base housing boss 314 is machined flat and provided with the finished bore 324, forming the closed interior chamber. A reflecting mirror assembly 327 is received in the bore 324 and is generally comprised as follows: an adjusting base 328 has a cylindrical body received in the bore 324 and sealed with an O-ring 329, and a flange 330 is secured against the finished surface 326 of the boss. A plurality of set screws 331,332 are received in a circular pattern around a gimbal rod 333 which passes through the adjusting base 328 along a centerline 334 displaced from the centerline 335 of the boss 314. The gimbal rod 333 is, basically, a long screw having a smooth diameter terminating at a head 336, and a spherical bearing 337 is received on the diameter against the head 336. The outer race of the spherical bearing 337 is snugly received in a counterbore 338 of a cylindrical mirror mounting block 339. The counterbore 338 meets with a clearance hole 340 through the block so that the block 339 may be swiveled about the spherical center 341. The spherical center 341 is located along the bisector line 342 of angle alpha, the included angle between the first and second roll axes 38,40. The mounting block 339 is received in an adjustable block 343 in turn seated against the adjusting screws 331,332. The sdjustable block 343 has a surface 344 mitered off parallel to a line normal to the bisector line 342 of angle alpha. The gimbal rod 333 is threaded at its bottom end, and a tension spring 345 is seated in a counterbore 346 and held on the rod 333 by a washer 347 and nut 348, to bias the adjustable block 343 against the screws 331,332. The outer end of the gimbal rod passes through a cover washer 349 and a pair of jam nuts 350 to enclose the spring assembly. The mirror mounting block 339 is cylindrical about the bisector line 342 having a concentric pilot 351 received in a bore in the mitered surface 344 of the adjustable block 343. The outer diameter of the mirror mounting block 339 is threaded to receive a retaining cap 352 which holds a flat cylindrical mirror 353 securely in position. The mirror 353 is adjusted until the mirror reflecting surface 354 accurately passes through the intersection point 355 of the first and second roll axes 38,40 and lies at an angle which reflects the laser beam 12, received along the first roll axis 38, to the second roll axis 40.

The boss 302 of the turret housing 236 is machined with a flat exterior surface 356, and a bore 325 extends therein, forming the interior chamber, along line 303 bisecting the angle beta formed between the second and third roll axes 40,41. In a manner similar to that described in connection with the base housing 209, the turret housing 236 also has an adjusting base 357 received in the bore 325 and having a flange 358 bolted to the surface 356. The gimbal rod 333 passes centrally through the adjusting base 357, and a plurality of adjusting screws 331,332 are received in a circular pattern around the gimbal rod 333. A spherical bearing 337 is held on the gimbal rod 333 against the head 336 and the bearing outer race is received in a bore 359 in the mirror mounting base 360, reacting against a plate 361 fastened to the base 360. Plate 361 has a clearance hole 362 to permit the mirror 353 swivel. The front surface of the base 360 receives the flat reflecting mirror 353, held by the retainer cap 352 threadably received on the outer diameter of the base 360. The mirror reflecting surface 354 is adjusted io accurately pass through the intersection point 363 of tbe second snd third roll axes 40,41 and the surface 354 is angularly aligned so that a laser beam 12 passing along the second roll axis 40 will be reflected directly along the third roll axis 41. The gimbal rod 333 is provided with the tension spring 345 and adjusting nut 348 and washer 347 received in a counterbore 364 in the back surface of the adjusting block 357 to bias the mirror assembly against the adjusting screws 331,332.

Diagrammatic Wrist Designs

Figure 15:
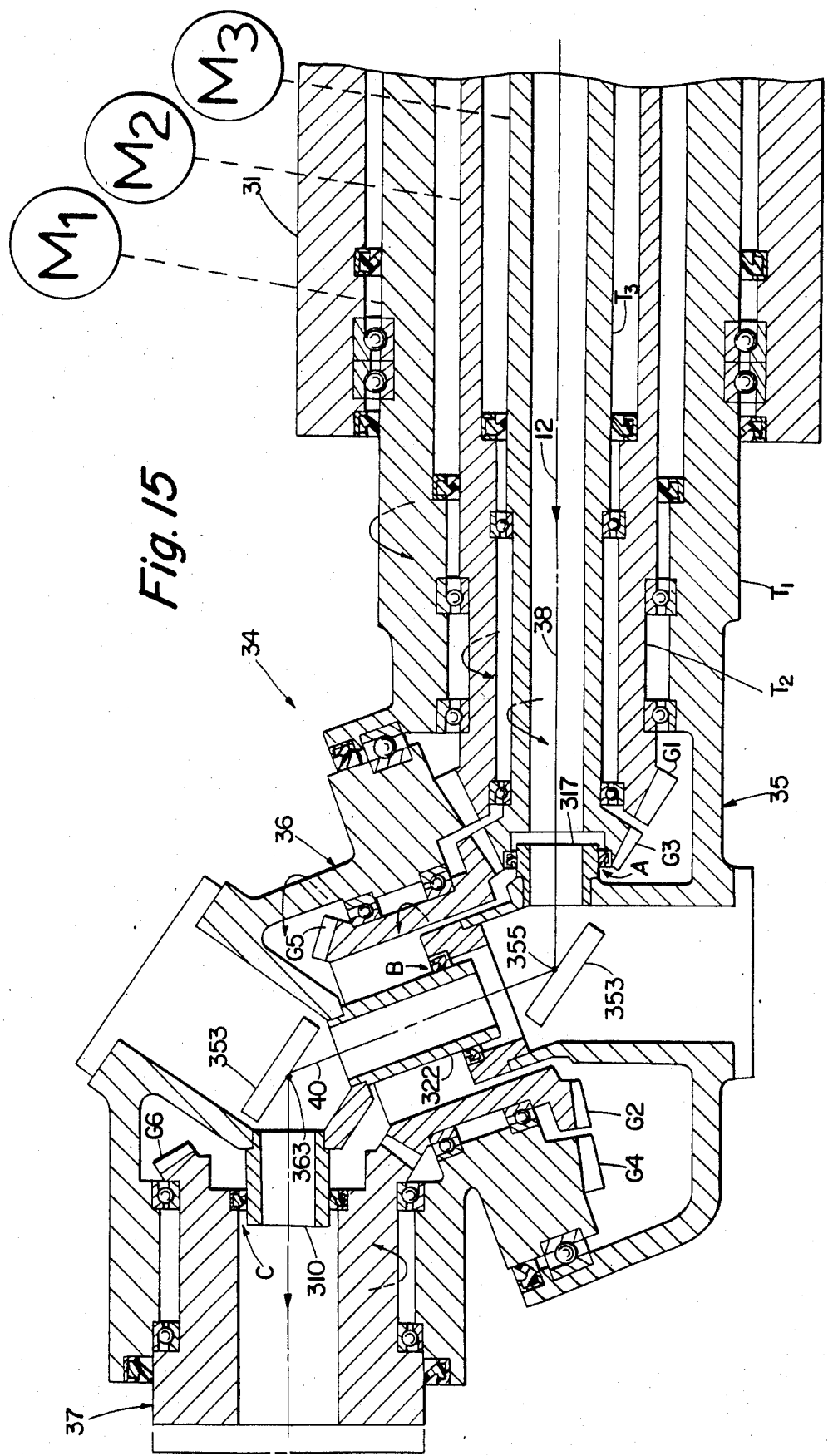
FIG. 15 is a diagrammatic view depicting the geometry of FIG. 14.

FIG. 15 illustrates a simplified diagrammatic structure for the wrist of FIG. 14 wherein three concentric drive tubes, T1, T2, and T3, are driven by respective drive motors, M1, M2 and M3 in a nonrotating forearm 31. The simplified structure shows that drive tube T1 provides the roll 1 movement, i.e., around the roll 1 axis 38. A gear, G1 on drive tube T2 serves to provide the rotational movement to the turret unit 36, around the roll 2 axis 40, since gears G1 and G2 (on the turret) are in mesh. In order to provide rotary movement to the end effector unit 37, the central drive tube T3 has a gear G3 located at its inboard end, in mesh with the gear G4 of a rotary spindle supported in the turret unit. The spindle also has a gear G5 at its opposite end, in mesh with gear G6 of the end effector unit so that unit will rotate sround the roll 3 axis 41. The mirrors 353 are supported as shown in FIG. 14, within the respective turret unit 36 and base housing unit 35. The sealing tubes 310, 317, snd 322 are sealed at seal points A, B, and C, to provide a closed path for the laser beam 12.

Figure 16:
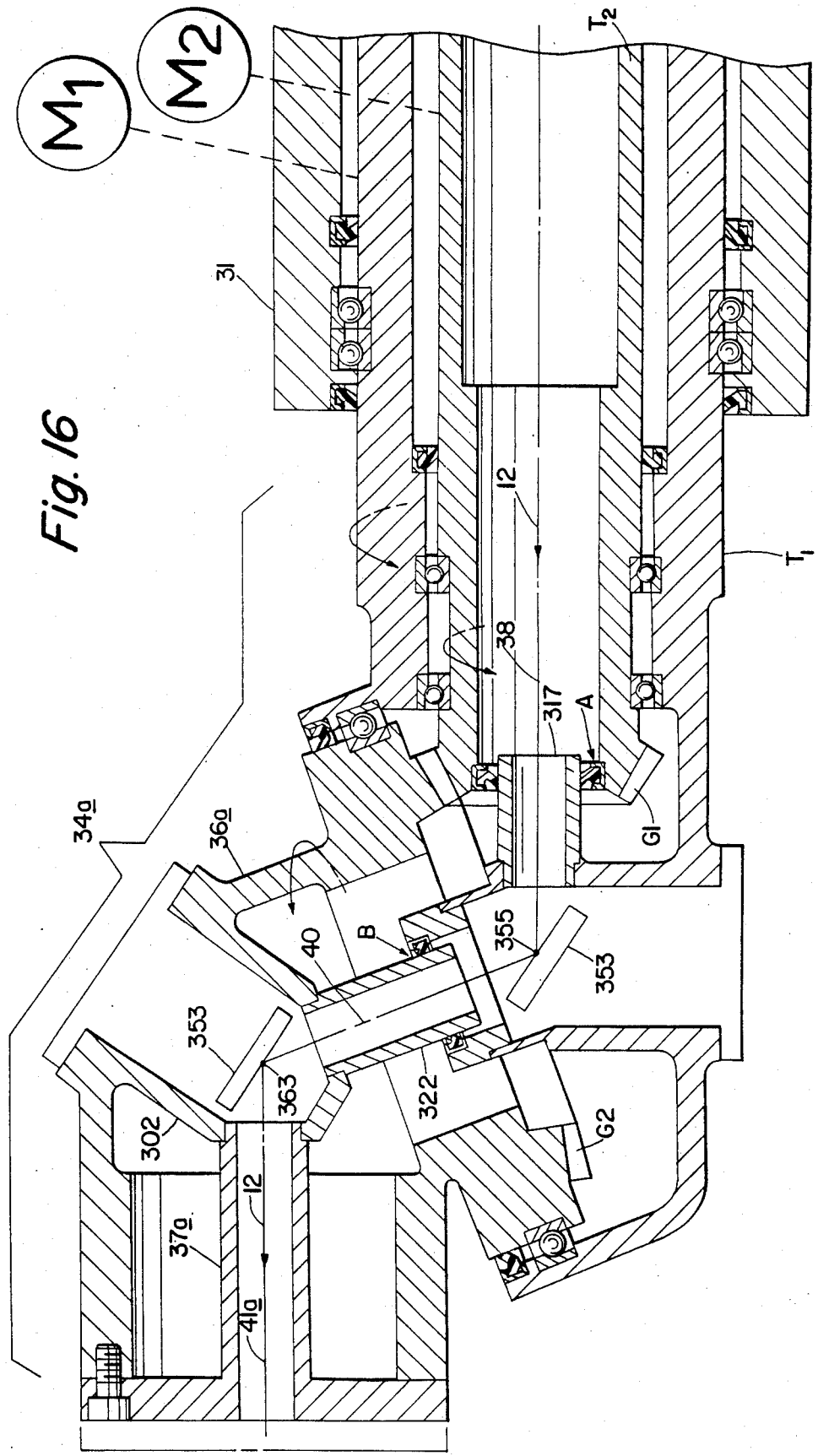
FIG. 16 is a diagrammatic view through a laser robot wrist having two roll axes and a sealed beam path.

An alternate embodiment of the sealed beam path wrist unit of FIG. 15 is shown in FIG. 16, wherein only two roll axes, 38 and 40 are provided. In the structure of FIG. 16, therefore, the inner drive tube T3 is omitted, and the sealing tube 317 is sealed with the second drive tube T2 at point A. The second sealing tube 322 is sealed at point B along the second roll axis 40. The turret housing boss 302 is provided with a fixed nonrotating tube 37a, so that there is no rotation around the axis 41a as the laser beam 12 exits the wrist 34a. Gears G1 and G2 are used to provide the roll 2 axis movement to the turret unit 36a. The drive tubes T1 and T2 are shown powered by motors M1 and M2, and motor M3 is omitted.

Figure 17:
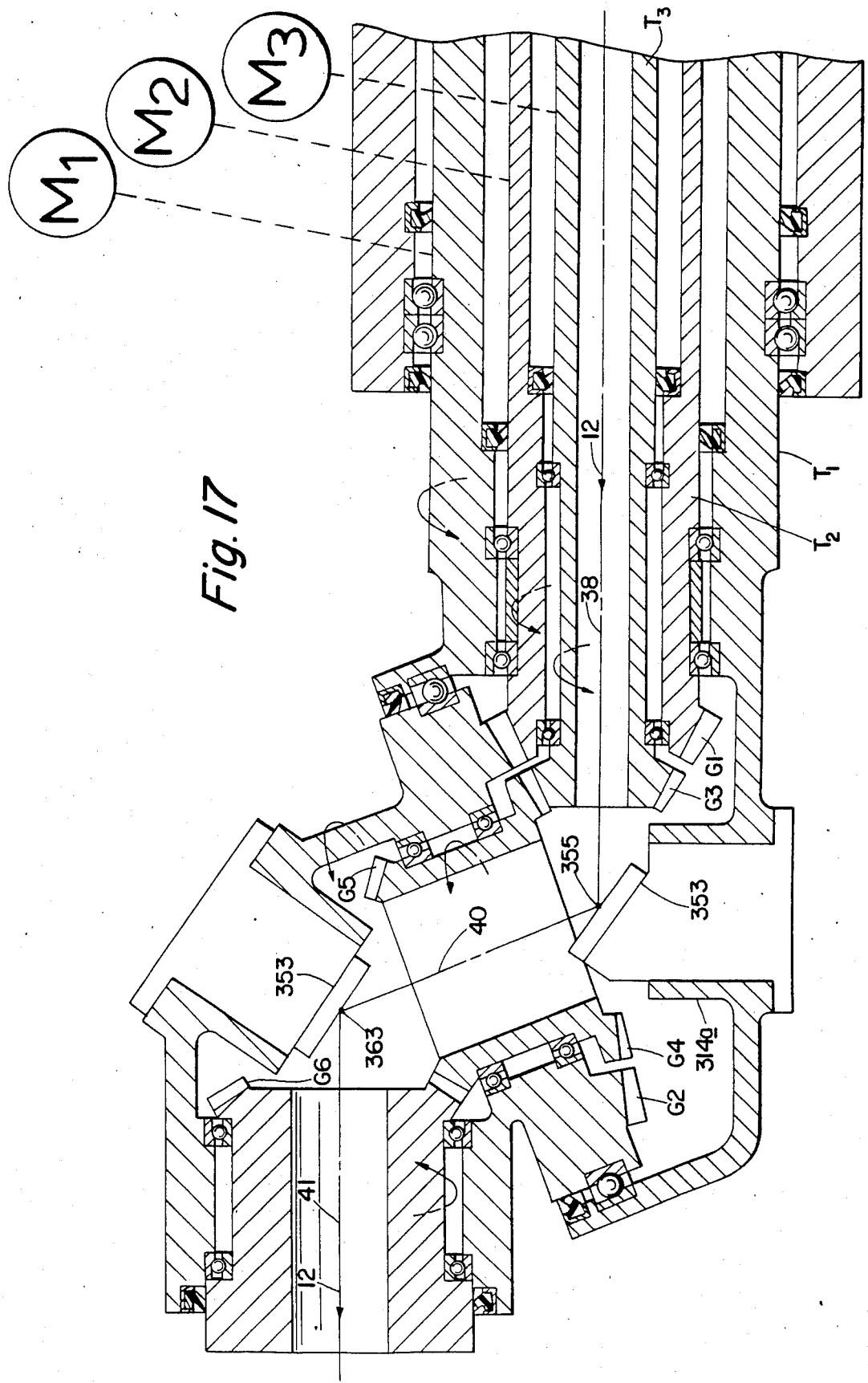
FIG. 17 is a diagrammatic view through a laser robot wrist having three roll axes.

FIG. 17 depicts an alternate embodiment of the wrist structure wherein a three-roll wrist is depicted without a sealed beam path. Drive tubes T1, T2, and T3 provide the rotational movements around the three-roll axes 38, 40, and 41. The mirror supporting bosses 302a, and 314a, are truncated and serve only for structure support and not for sealing of a beam Path. The mirrors 353 are exposed to the internal mechanism of the unit, and the design is useful for a relatively clean, light duty, geared wrist where potentially deleterious particles are not created to interfere with the mirrored surfaces and the laser beam path.

Figure 18:
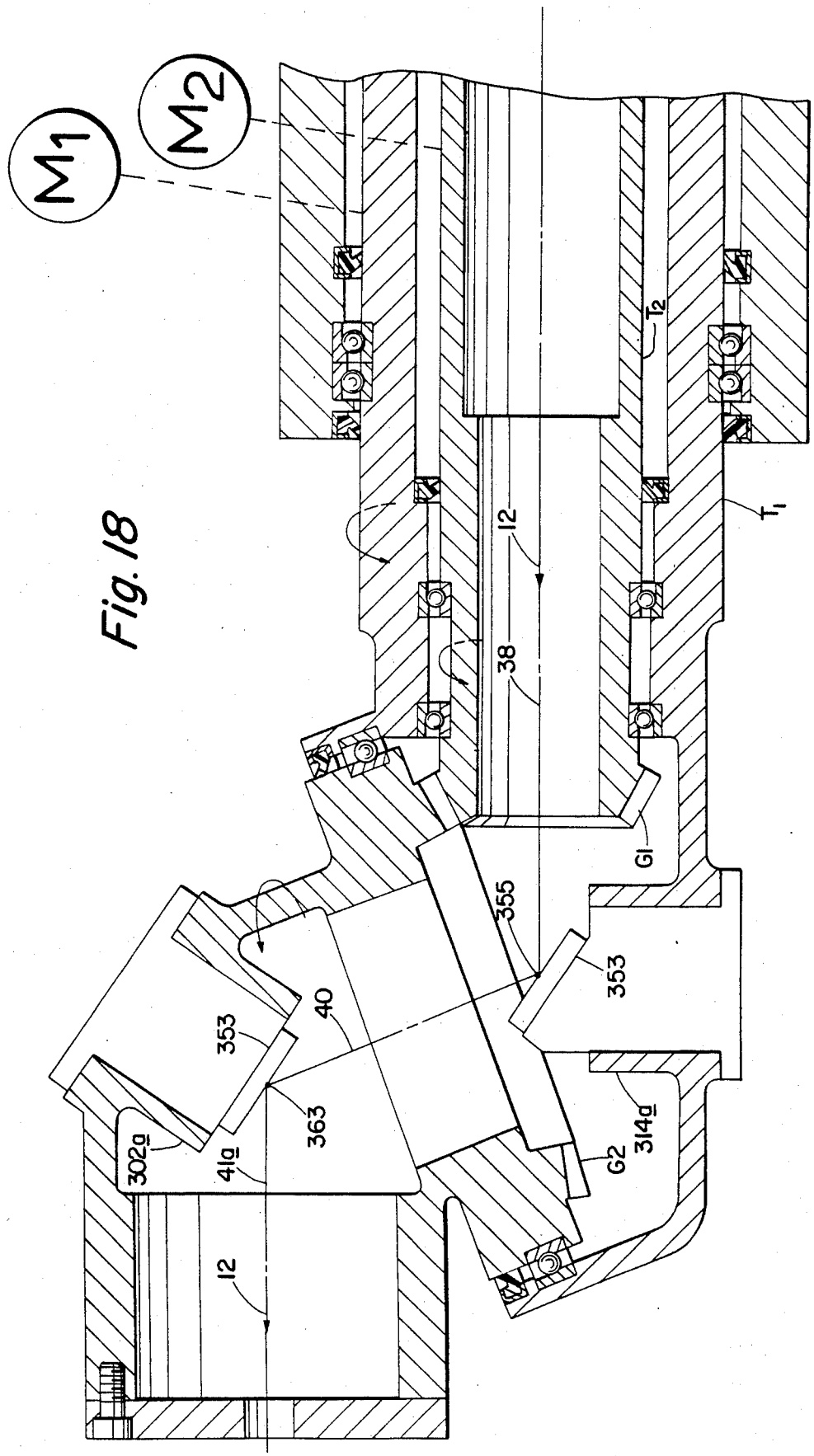
FIG. 18 is a diagrammatic view through a laser robot wrist having two roll axes.

FIG. 18 depicts a two-roll axis wrist, where only drive tubes T1 and T2 are utilized to provide rotational movements about the roll 1 and roll 2 axes, 38, 40. Again, as in FIG. 17, the mirror supporting bosses 302a and 314a are truncated and are used only for structural support and not for beam path sealing.

With reference to FIGS. 16 and 18, it will be appreciated that it is not necessary to provide a roll three movement when the tooling unit consists primarily of a beam focusing unit, 700 (FIG. 32) i.e. a lens support structure, serving to produce a focused beam point, and that the third roll movement is particularly needed when the tooling package consists of a unit which must be oriented around a workpiece and the like. An example of such a tooling unit would be a C-frame spot welding unit 800 (FIG. 33), wherein a beam path is conducted to the anvil portion 801 of the C-frame 802, and the C-frame 802 must be rotated at various times to accommodate a workpiece 803 for clamping purposes.

Laser Beam Combiner

Figure 19:
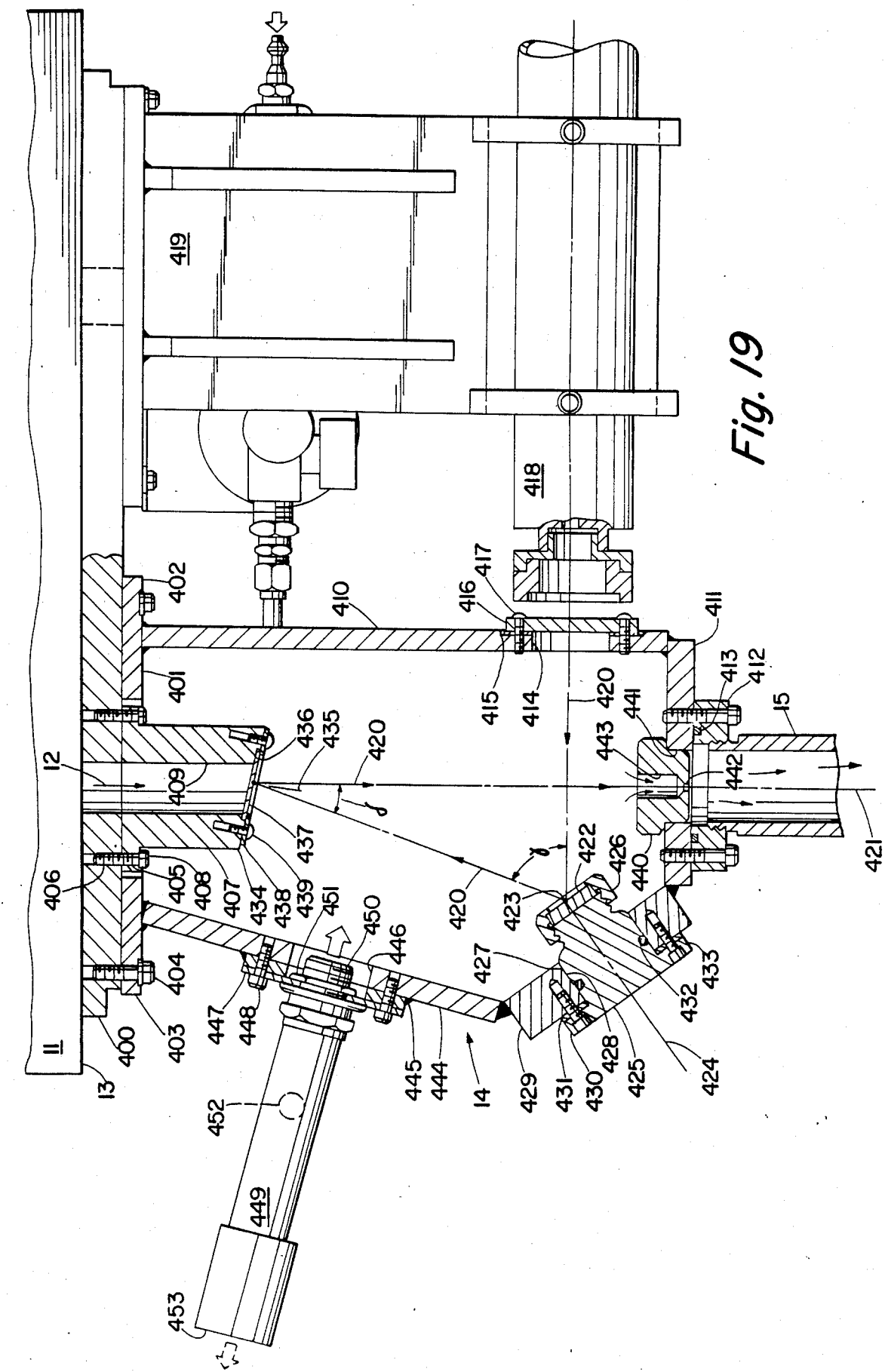
FIG. 19. is a plan section through the laser beam combiner, taken along the line 19—19 of FIG. 1.
Figure 20:
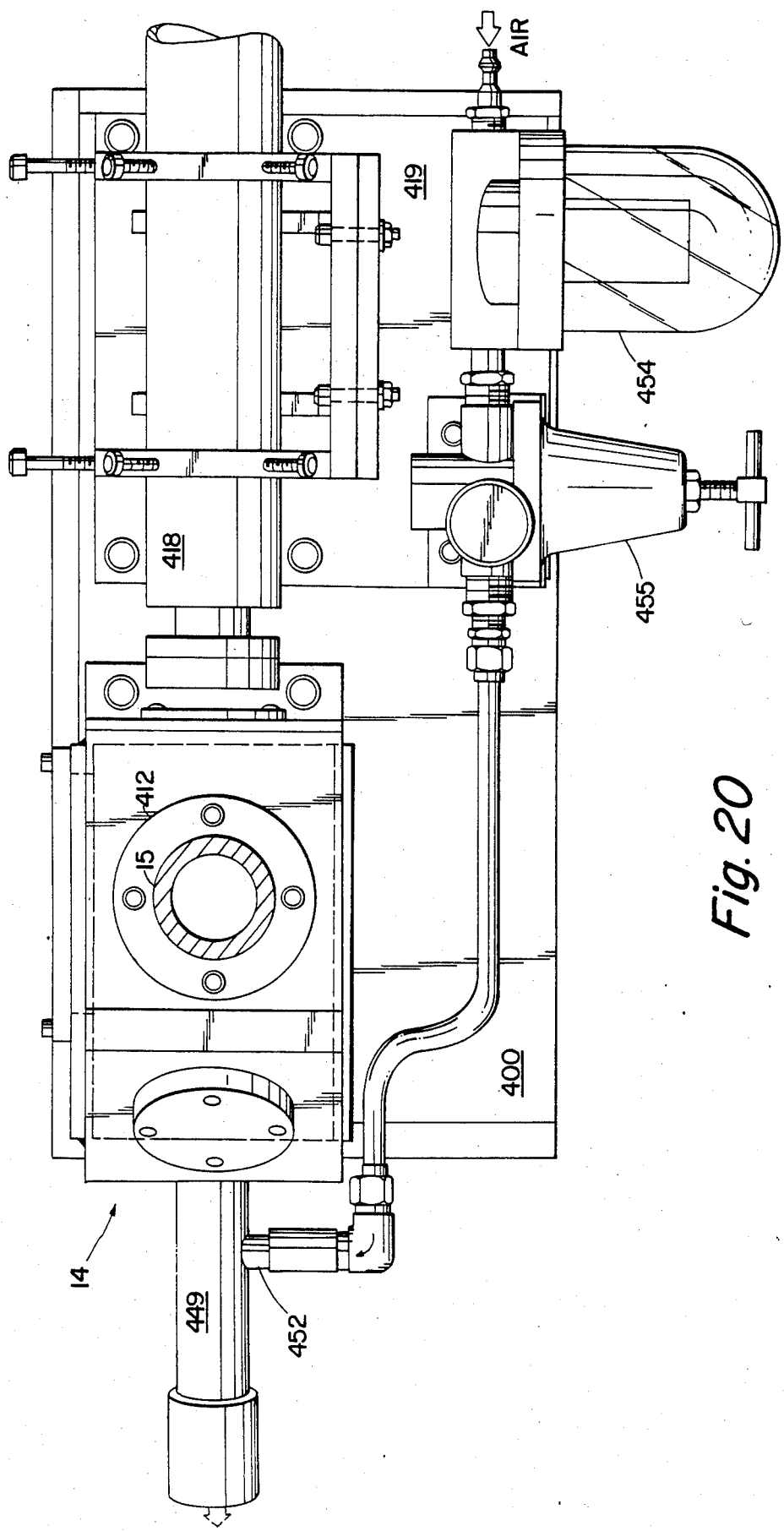
FIG. 20 is an elevational view of the laser beam combiner, taken along the line 20—20 of FIG. 1.

Referring to the plan section of FIG. 19 and the front view of FIG. 20 together, the laser beam combiner 14 of FIG. 1 is shown affixed to a mounting plate 400 mounted to the front, or exit end 13 of the laser generator unit 11. The beam combiner 14 is of welded construction, having a baseplate 401 extending as side flanges 402,403 secured by cap screws 404. The baseplate 401 has a central horizontal hole 405 with clearance around the flange 406 of a laser entry tube 407 flange-mounted with screws 408 against the baseplate 400. The tube 407 has a central aperture or bore 409 for the passage of the high power laser beam 12 emanating from the laser generator unit 11. The beam combiner 14 has a side plate 410 extending parallel to the laser beam 12, and an end plate 411 is aligned at 90° to the side plate 410. The end plate 411 has a threaded collar 412 secured thereto, sealed with an O-ring 413 and the first light pipe 15 is threadably received in the collar 412. The side plate 410 has an aperture or hole 414 and spot face 415 covered by a transparent window 416 which is gasketed and held in position witb buttonhead screws 417. A relatively low-power laser generator unit 418—for example, a helium neon (HeNe) laser, which emits a red visible light beam—is mounted at 90° to the side plate 410 on a mounting bracket 419 fastened to the mounting plate 400.

The laser unit 418 is aligned so that the incoming beam 420 will form a right triangle with the axis 421 of the light pipe 15. In order to do so, a base angle alpha is selected, and the apex angle delta would then be 90° minus alpha. A reflecting mirror 422 is positioned at the base corner 423 of the triangle, normal to a line 424 bisecting angle alpha. The mirror 422 is held against the end of a positioning plug 425 by a retaining cap 426 threadably received on the plug 425. The positioning plug 425 has a pilot 427 received in a close-fitting bore 428 in a thick, angled side wall 429 of the box 14, and a flange 430 is received against a fitting washer 431 to adjustably position the mirror 423. The pilot 427 is sealed with an 0-ring 432, and the plug 425 is held in position by cap screws 433 received through the flange 430. The end 434 of the laser entry tube 407 is machined flat, normal to a line 435 bisecting angle delta, and a shallow counterbore 436 in the surface 434 receives a gallium-arsenide (GaAs) window 437, which is transparent to the $CO_2$ wavelength and reflective to the He-Ne wavelength. This allows the $CO_2$ beam, to pass through to the light pipe while reflecting the He-Ne beam along the same line which is retained by a retaining ring 438 and screws 439. In order to assure that the low power, visible laser beam 420 is centered coaxially with the axis 421 of the light pipe 15, a tooling plug 440 is inserted in a close-fitting bore 441 in the end plate 411 of the box 14. The plug 440 has a knurled outer diameter and has a small central aperture 442 and a counter-drilled clearance hole 443. When the mirror 422 is positioned correctly, the visible beam 420 will pass through the aperture 442. This beam 420 is utilized for aligning the various mirrors on the robot 10, since the higher-power main laser beam 12 is invisible to the eye. After aligning the laser components, the tooling plug 440 is removed, and the low-power laser unit 418 may, optionally, be turned off, or left on to track the larger-diameter, high-power beam 12. The beam combiner 14 has an additional side plate 444 enclosing the structure, having a welded circular flange 445 and a clearance hole 446 therethrough. A thin mounting plate 447 is gasketed and secured to the flange 445 by cap screws 448, and the mounting plate 447, in turn, supports a vortex tube 449 by means of a threaded end 450 passing through the plate 447 and secured with a locknut 451. The vortex tube 449 is of the type available from the Vortec Company, Cincinnati, Ohio, wherein compressed air enters through a side inlet 452 at a first reference temperature. Through a vortex/spinning action, cold air will exit one tube end 450 and hot air will exit the other end 453. The cold air flows through the box 14 and down through the light pipe 15 to cool the various laser components and to slightly pressurize the system so as to prevent the entry of airborne contaminants from the atmosphere. The laser mounting bracket 419 also carries an air filter 454 and pressure regulator 455 tubed in series with the vortex tube 449 to regulate and clean the air received from an air pressure source (not shown).

Beam Switching Box

During periods of the robotic cycle when the laser beam 12 is not needed, the beam may be routed to auxiliary units such as laser tools or robots (not shown), connected to an auxiliary light pipe 18c of a beam switching box 20.

Figure 22:
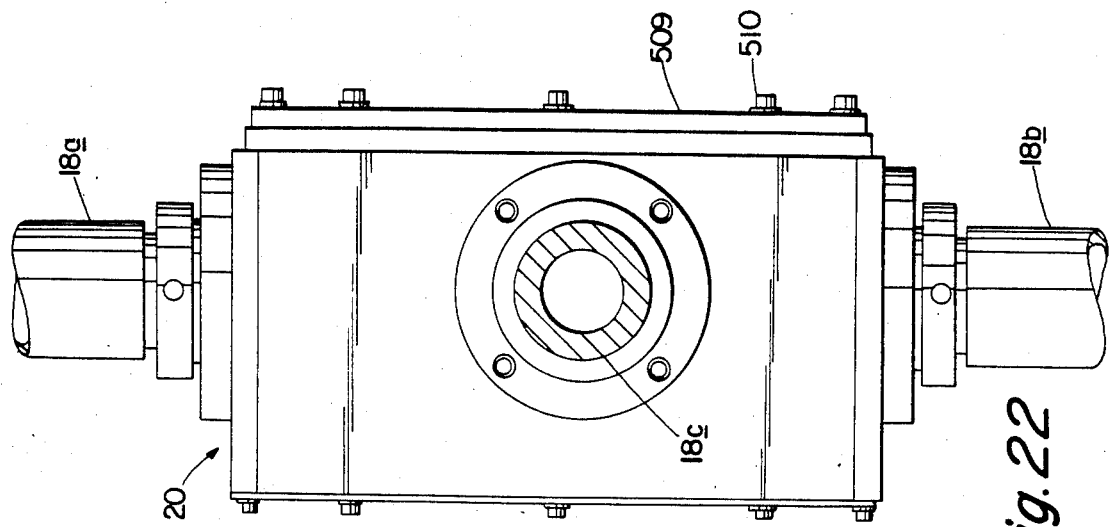
FIG. 22 is a side elevational view of the beam switcher, taken along the line 22—22 of FIG. 21.
Figure 21:
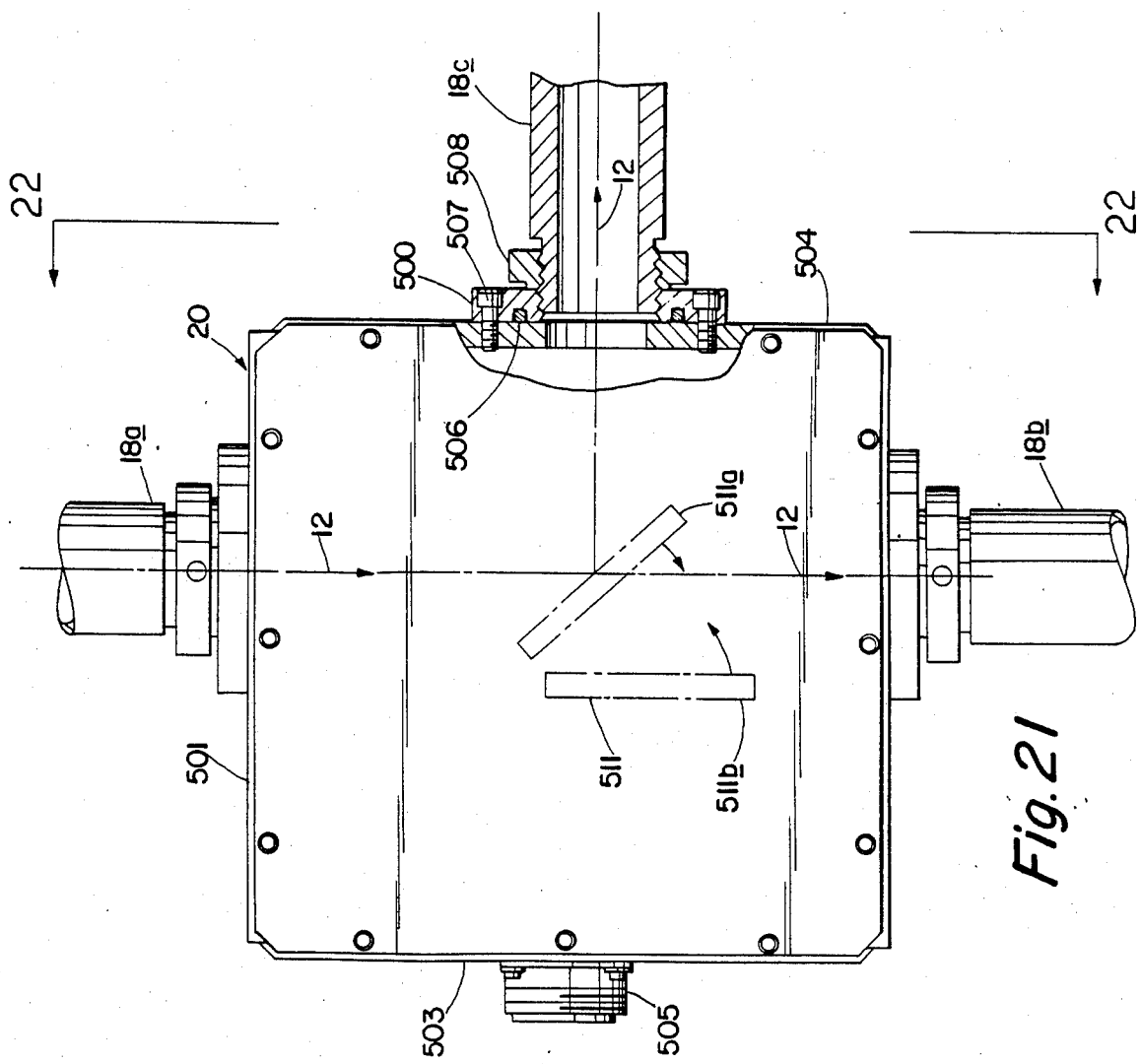
FIG. 21 is a plan view of the beam switcher, taken along the line 21—21 of FIG. 1.
Figure 27:
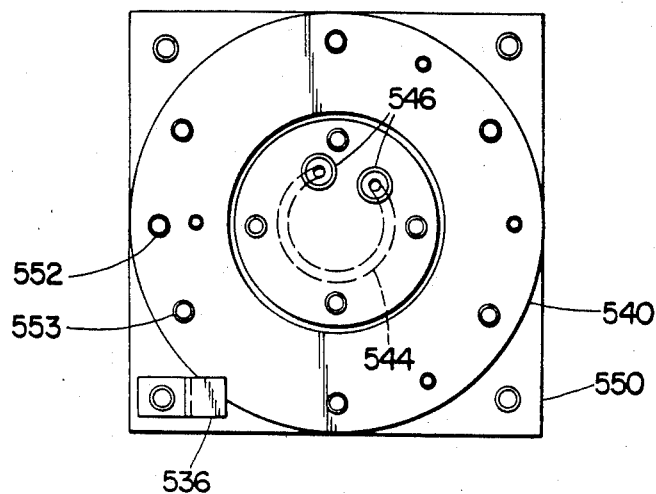
FIG. 27 is an elevational view of the backside the mirror adjusting assembly of the laser beam switcher, taken along the line 27—27 of FIG. 23.

The plan view depicted in FIG. 21 illustrates the square beam switching box 20 of FIG. 1, having entry and exit light pipes 18a and 18b secured in position with threaded collars 500 secured to the sides 501,502 of the box 20. Of the remaining two sides 503,504 of the box 20, one side 503 carries a multi-pin electrical connector 505 for a motor and switches (FIGS. 23-27) and the other side 504 carries a threaded collar 500 sealed with an O-ring 506 and secured with screws 507. A side light pipe 18c is threadably received in the collar 500 and held thereto by a locknut 508. Since the light pipes 18a,b,c are tubular and do not extend through the box 20, it can be seen from the view shown in FIG. 22 that the box can be secured to a baseplate 509 by screws 510 received through the baseplate 509 and into the sides 501-504.

A mirror 511 is pivotable between closed and open positions 511a,511b to either reflect the laser beam 12 to the side pipe 18c or pass the beam 12 through to the in-line pipe 18b.

Figure 24:
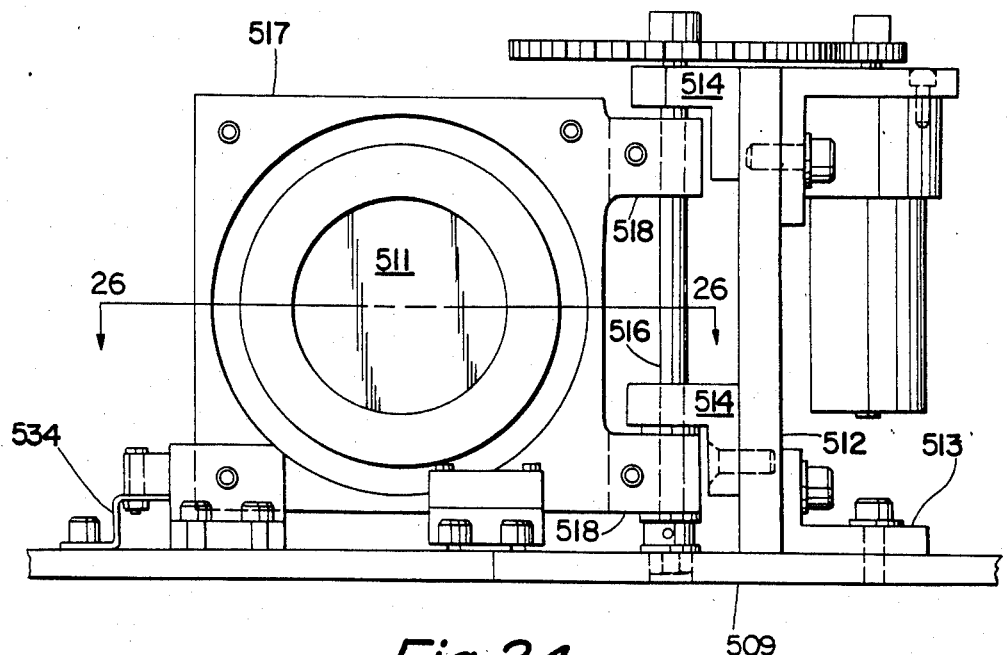
FIG. 24 is an elevational view of the beam switcher mechanism taken along the line 24—24 of FIG. 23.

Referring simultaneously to FIGS. 23 and 24, the sides 501-504 of the box 20 are removed for clarity and FIG. 24 shows that the baseplate 509 carries a vertical mounting plate 512 attached to a right angle footplate 513. The vertical mounting plate 512 carries a pair of identical right angle bearing blocks 514 on its opposite side, which contain bearings 515 (see FIG. 25) to support a vertical pivot rod 516. The pivot rod 516, in turn, carries a mirror gate 517, which is a generally square vertical plate having side-extending lugs 518 which are bored to fit the pivot rod 516. Saw slots 519 and clamping screws 520 secure the gate 517 to the rod 516. The gate 517 is fitted with a pair of fitting washers 521 to take the vertical shake out of the assembly, the lower fitting washer 521 resting against a collar 522 secured to the pivot rod 516. The bottom of the pivot rod 516 extends into a flanged bushing 523 in the baseplate 509. The top of the pivot rod 516 carries a gear 524 secured by a hub set screw 525 tightened against a flat 526 on the rod 516. The top of the vertical mounting plate 512 carries a motor mounting bracket 527 which serves to position a drive motor 528 in a vertical attitude. The shaft 529 of the drive motor 528 carries a drive pinion 530 secured by a set screw 531, the pinion 530 being in constant mesh with the gear 524. The plan view of FIG. 23 shows that the gate 517 is pivotable between the closed position shown in solid, i.e., resting against a closed position stop block 532, and an open position shown in phantom, i.e. resting against an open position stop block 533. Three identical switch mounting brackets 534 are secured to the baseplate 509, and support identical push button switches 535a,b,c. Two of the switches 535a,b are activated or "made" when the gate 517 is in the closed position, while the third limit switch 535c is activated by a bracket 536 (secured to the back of the gate) when the gate 517 is open. As can be seen in FIG. 24, the closed position of the gate and its control elements are angled with respect to the baseplate so that an incoming laser beam 12 will be reflected 90° to the side when the gate is closed, and the beam 12 will flow directly through when the gate 517 is opened.

Figure 26:
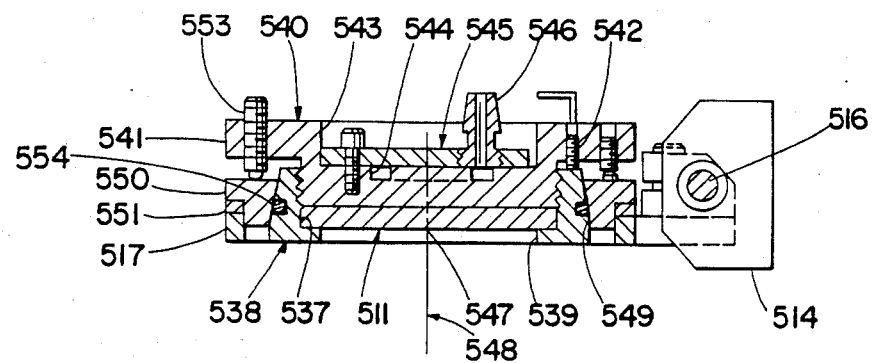
FIG. 26 is a plan section through the mirror adjusting assembly of the beam switcher, taken along the line 26—26 of FIG. 24.

The mirror mounting assembly for the mirror gate 517 is shown in FIG. 26, where the circular mirror 511 is positioned in the counterbore 537 of a mirror retainer 538, the retainer 538 having a central clearance hole 539 extending therethrough. The counterbore 537 is threaded and received on the threaded diameter of a mirror adjusting bracket 540. The bracket 540 has a cylindrical flange 541 adjacent to the threaded diameter screwed into the mirror retainer 538, and provided with a stop screw 542 to prevent overtightening of the mirror 511. The back face of the mirror adjusting brackets 540 has a counterbore 543, with a circular facial groove 544 machined into the bottom thereof, in the shape of an incomplete ring with approximately 60° between the start and stop points of the groove 544 (see FIG. 27). A cover plate 545 is seated against the bottom of the counterbore 543 to enclose the groove 544, and pair of barbed hose fittings 546 are threadably received in the coverplate to provide for coolant flow through the groove 544 when it is desired to cool the mirror 511. The outer surface of the mirror retainer 538 is spherical, having a radius swung from the intersection point, or reflecting point 547, of the surface of the mirror 511 at the centerline 548. A spherical socket 549 is provided in a square mounting plate 550 secured to the back of the gate 517 and accurately positioned with a fitting washer 551 to establish the correct adjustment to the mirror reflecting point 547. The flange 541 of the mirror adjusting bracket 540 has three equally-spaced swivel-pad adjusting screws 552 which bear against the mounting plate 550, and thereby provide an accurate swivel adjustment of the spherical mirror retainer 538. A plurality of commercial spring plungers 553, each having a threaded body and spring-loaded nose, are threadably received in the flange 541 to bias the mirror retainer 538 in its spherical socket 549. An O-ring 554 may be provided on the retainer 538 to introduce a slight drag, to prevent slippage when adjusting the mirror 511.

Elbow Mirror Assemblies

Referring to FIGS. 1, 28, and 29, the fixed elbow mirror assembly 16 is shown having a main body 600 drilled with intersecting 90° holes 601,602. The holes 601,602 are counterbored to receive a threaded bushing 603 which is bonded into place, and the bushing 603, in turn, receives a threaded light pipe adapter 604 which is secured by a washer 605 and locknut 606. The adapter 604 has a central hole 607 for the transmission of a laser beam 12, and the smooth outside diameter 608, adjacent to a flange 609, is provided to fit within the counterbore 610 of a light pipe 15. A mirror 511 and related mounting unit 611 is secured in a double counterbore at the mitered surface 612 of the elbow body 600. The mirror assembly is spherically-mounted, as shown in FIG. 26 and utilizing the same parts, with the flange of the mounting plate 550 secured to the main body 600. In a slight variation to the mirror-mounting assembly of FIG. 26, but the functional equivalent thereof, the commercial spring plungers 553 are mounted in the main body 600 to bias the mirror retainer 538 into its socket 549.

An alternate embodiment of the fixed mirror assembly 16 is shown in FIG. 30, wherein a mirror 353 is supported by structure similar to that of the wrist unit turret boss 302 (FIG. 14). The mirror 353 is swivelable about a spherical bearing 337 journalled on the gimbal rod 333a, and the rod 333a is a shoulder screw positioned with its shoulder surface even with the bottom of a counterbore 613 in the special mirror adjusting block 614. The block 614 also serves as a cover for the assembly, having a flange 615 secured to the main body 616 of the assembly 16, and is counterbored to receive the mirror 353, mirror mounting base 360, and retaining ring 352. The adjusting block 614 is provided with three equally-spaced, swivel pad adjusting screws 552 to rock the mirror 353 about the spherical bearing 337. A small threaded stud portion 617 on the end of the gimbal rod 333a receives a pair of washers 618 having a stack of disc springs 619 therebetween, and a nut 620 holds the springs 619 together. Thus, by the assembly shown, it can be seen that the adjusting screws 552 may be extended to provide a slight preload of the first washer 618 against the spring stack as the gimbal rod 333a is thrusted toward the reflection point 621.

A rotatable elbow unit 415 is depicted in FIG. 31, wherein the mirror assembly 622 has a main body 623 having 90° openings 624,625 coacting with an internal mirror 511. The first opening 624 is provided with a stationary adapter ring 603 which is cemented in position (as also shown in FIG. 28). However, the second opening 625 of the main body 623 is provided with a special tubular adapter portion 626. The adapter 626 carries spaced-apart antifriction bearings 627 in a suitable bore, and an adapter tube 628 is carried within the bores of the twin bearings 627. The adapter tube 628 is axially positioned by an internal shoulder 629. The outer end of the tube 628 extends beyond the adapter portion 626 and carries a retaining cap 630, secured by screws 631. The cap 630 may comprise an integral part of a continuing light pipe 44. A seal 632 is carried in the adapter portion 626 to sealingly engage the adapter tube 628 to prevent the entry of contaminants into the system.

The assembly shown in FIG. 31 therefore permits the elbow unit 45 to relatively rotate around a light pipe 44 while maintaining the accuracy of the mirror setting.

Laser Tooling

Figure 32:
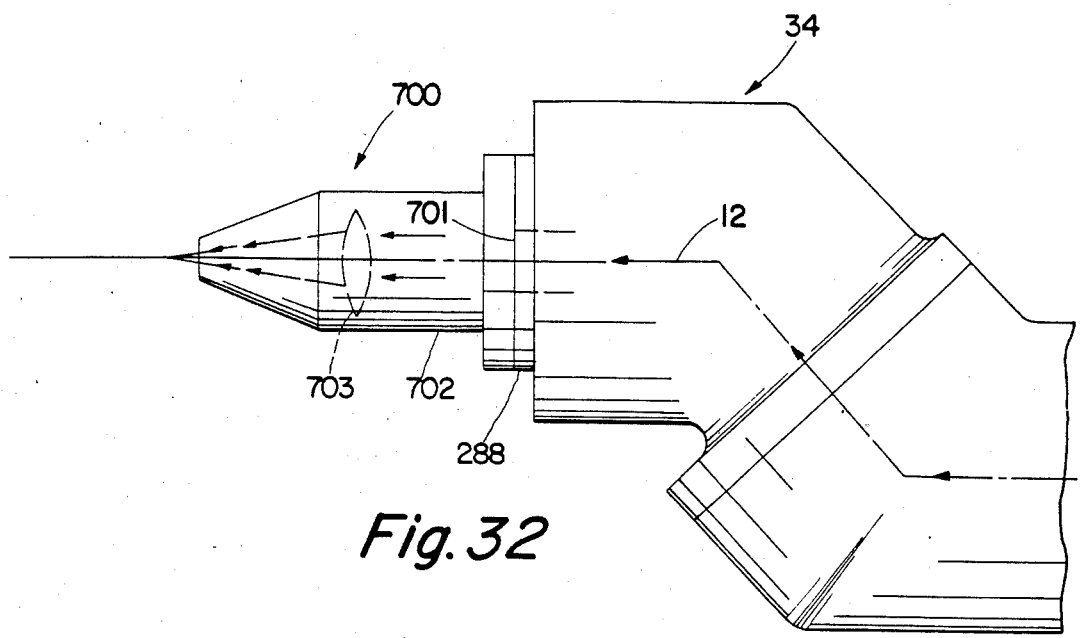
FIG. 32 is a side elevational view of a laser robot wrist having a beam focus assembly.

FIG. 32 depicts a beam focusing unit 700 affixed to the end effector tooling plate 288, at the beam exit end 701 defined on the plate 288. The focusing unit 700 consists, basically, of a housing, or nozzle 702, supporting a beam-concentrating focus lens 703.

Figure 33:
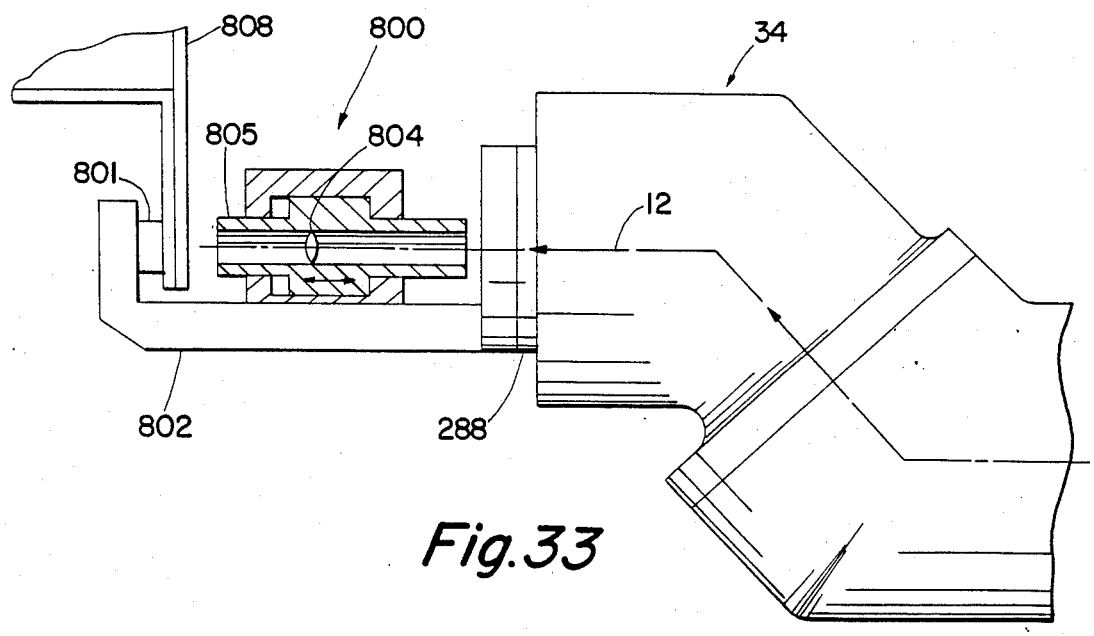
FIG. 33 is a side elevational view of a laser robot wrist having exemplary laser tooling.

FIG. 33 depicts a C-frame spotwelding unit 800, having a relatively fixed anvil portion 801 on the C-frame 802, which is brought into contact relatively with a workpiece 803. The spotwelding unit 800 has a beam focusing portion 804 and a relatively-movable clamp portion 805. The three-roll movement of the wrist unit 34 permits great maneuverability for the robot 10 when applying robot tooling.

While the invention has been shown in connection with a preferred embodiment and several alternate embodiments, it is not intended that the invention be so limited. Rather, the invention extends to all such designs and modifications as come within the scope of the appended claims.

What is claimed is:

1. A sealed-beam laser wrist, including:
 a base housing, having
 a first wrist axis;
 a turret housing, mounted to said base housing and rotatable about
 a second wrist axis, transverse to, and intersecting said first wrist axis at
 a junction point;
 means for driving said turret housing about said second axis., said means for driving including drive elements passing within said base housing; and
 means for mounting said base housing to a laser forearm assembly;
wherein the improvement comprises:
 a mirror chamber within said base housing, said junction point lying within said chamber;
 a mirror mounted within said mirror chamber, said mirror having a mirror reflecting surface intercepting said junction point;
 a continuous laser beam pathway through said base housing, said mirror chamber and said turret housing, said beam pathway extending collinearly with said first and second wrist axes from a beam entrance end defined on said base housing, to a beam exit end defined on said turret housing;

first duct means enclosing said first wrist axis and communicating with said mirror chamber and said base housing beam entrance end;

second duct means enclosing said second wrist axis and communicating with said mirror chamber and said turret housing beam exit end; and rotary slip joint means in said second duct means for permitting said turret housing to rotate with respect to said base housing while maintaining enclosure of said second wrist axis whereby said laser beam pathway is enclosed with respect to said driving elements passing within said base housing.

2. A sealed-beam laser wrist, including:

a base housing, having a first wrist axis;

a turret housing, mounted to said base housing and rotatable about a second wrist axis, transverse to, and intersecting said first wrist axis at a first junction point;

a third wrist axis in said turret housing, transverse to, and intersecting, said second wrist axis at a second junction point;

means for driving said turret housing about said second axis, said means for driving including drive elements passing within said base housing; and means for mounting said base housing to a laser forearm assembly;

wherein the improvement comprises:

a first mirror chamber within said base housing, said first junction point lying within said first chamber;

a second mirror chamber within said turret housing, said second junction point lying within said second chamber;

a first mirror. mounted within said first mirror chamber, said first mirror having a mirror reflecting surface intercepting said first junction point;

a second mirror mounted within said second mirror chamber, said second mirror having a mirror reflecting surface intercepting said second junction point;

a continuous laser beam pathway through said base housing, said first and second mirror chambers, and said turret housing, said beam pathway extending collinearly with said first, second and third wrist axes from a beam entrance end defined on said base housing, to a beam exit end defined on said turret housing;

first duct means enclosing said first wrist axis and communicating with said first mirror chamber and said base housing beam entrance end;

second duct means enclosing said second wrist axis and communicating with said first and second mirror chambers;

third duct means enclosing said third wrist axis and communicating with said second mirror chamber and beam exit end; and rotary slip joint means in said second duct means for permitting said turret housing to rotate with respect to said base housing while maintaining enclosure of said second wrist axis whereby said laser beam pathway is maintained enclosed with respect to said driving elements passing within said base housing.

3. The sealed-beam laser wrist of claim 2, further comprising:

a tooling plate, mounted to said turret housing at said beam exit end, said toling plate rotatable about said third wrist axis;

means for driving said tooling plate about said third wrist axis, said means for driving said tooling plate including drive elements passing within said base housing; and rotary slip joint means in said third duct means for permitting said tooling plate to rotate with respect to said turret housing while maintaining enclosure of said third wrist axis whereby said laser beam pathway is maintained enclosed with respect to said driving elements passing within said base housing.

4. An improved laser wrist and forearm assembly for a laser robot comprising:

a base housing, rotatable about a first wrist axis;

a turret housing mounted to said base housing and rotatable about a second wrist axis, transverse to, and intersecting said first wrist axis at a junction point;

a robotic forearm, rotatably supporting a plurality of concentric drive tubes rotatable about a forearm axis;

means for mounting said base housing to one of said drive tubes;

means for rotatably driving said tubes; and means for drivingly-connecting another of said tubes to said turret housing, said means for drivingly-connecting including drive elements passing within said base housing;

wherein the improvement comprises:

a mirror chamber within said base housing, said junction point lying within said chamber;

a mirror mounted within said mirror chamber, said mirror having a mirror reflecting surface intercepting said junction point;

a continuous laser beam pathway through said forearm, said tubes, said base housing, said mirror chamber, and said turret housing, said beam pathway extending collinearly with said forearm axis, and said first and second wrist axes from a beam entrance end defined on said forearm, to a beam exit end defined on said turret housing;

first duct means enclosing said first wrist axis and communicating with said mirror chamber and the innermost of said concentric drive tubes;

first rotary slip joint means in said first duct means for permitting said base housing to rotate with respect to said robotic forearm and said innermost of said tubes while maintaining enclosure of said first wrist axis;

second duct means enclosing said second wrist axis and communicating with said mirror chamber and said turret housing beam exit end; and second rotary slip joint means in said second duct means for permitting said turret housing to rotate with respect to said base housing while maintaining enclosure of said second wrist axis.

5. A sealed-beam laser wrist and forearm assembly for a laser robot including:

a base housing, rotatable about a first wrist axis;

a turret housing mounted to said base housing and rotatable about a second wrist axis, transverse to, and intersecting said first wrist axis at
a first junction point;
a third wrist axis in said turret housing, transverse to, and intersecting, said second wrist axis at
a second junction point;
a robotic forearm, rotatably supporting a plurality of concentric drive tubes, rotatable about a forearm axis;
means for mounting said base housing to one of said drive tubes;
means for rotatably driving said tubes; and
means for drivingly-connecting another of said drive tubes to said turret housing, said means for drivingly-connecting including drive elements passing within said base housing;
wherein the improvement comprises:
a first mirror chamber within said base housing, said first junction point lying within said first chamber;
a second mirror chamber within said turret housing, said second junction point lying within said second chamber;
a first mirror mounted within said first mirror chamber, said first mirror having a mirror reflecting surface intercepting said first junction point;
a second mirror mounted within said second mirror chamber, said second mirror having a mirror reflecting surface intercepting said second junction point;
a continuous laser beam pathway through said forearm, said tubes, said base housing, said first and second mirror chambers, and said turret housing, said beam pathway extending collinearly with said first, second and third wrist axes from a beam entrance end defined on said forearm, to a beam exit end defined on said turret housing;
first duct means enclosing said first wrist axis and communicating with said first mirror chamber and the innermost of said concentric drive tubes;
first rotary slip joint means in said first duct means for permitting said base housing to rotate with respect to said robotic forearm and said innermost of said tubes while maintaining enclosure of said first wrist axis;
second duct means enclosing said second wrist axis and communicating with said frist and second mirror chambers;
second rotary slip joint means in said second duct means for permitting said turret housing to rotate with respect to said base housing while maintaining enclosure of said second wrist axis; and
third duct means enclosing said third wrist axis and communicating with said second mirror chamber and said beam exit end;
whereby said laser beam pathway is maintained enclosed with respect to said driving elements passing within said base housing.

6. The sealed-beam laser wrist and forearm assembly of claim 5, further comprising:
a tooling plate, mounted to said turret housing at said beam exit end, said tooling plate rotatable about said third wrist axis;
means for driving said tooling plate about said third wrist axis, said means for driving said tooling plate including drive elements passing within said base housing; and
rotary slip joint means in said third duct means for permitting said tooling plate to rotate with respect to said turret housing while maintaining enclosure of said third wrist axis
whereby said laser beam pathway is maintained enclosed with respect to said driving elements passing within said base housing.

7. A sealed-beam laser robot forearm assembly for use with a laser wrist, having:
a hollow-elongate forearm housing having opposite forearm ends;
a plurality of concentric drive tubes rotatably journalled in said forearm housing, on a common forearm axis; and
drive means for independently rotating each of said concentric tubes;
wherein the improvement comprises:
a continuous laser beam pathway through the innermost of said concentric tubes, extending from one forearm end to the other;
means for mounting a laser wrist assembly to one of said concentric tubes at one of said forearm ends;
rotary slip joint means formed around said forearm axis in sealing engagement with said one of said concentric tubes; and
light pipe means at the other of said forearm ends for connecting said innermost tube with a laser light pipe system
whereby said laser beam pathway is enclosed and shielded from said drive means while said tubes are rotated.

* * * * *